(12) United States Patent  (10) Patent No.: US 8,980,786 B2
Murakami et al.  (45) Date of Patent: Mar. 17, 2015

(54) METAL OXIDE-PLATINUM COMPOUND CATALYST AND METHOD FOR PRODUCING SAME

(75) Inventors: Yasushi Murakami, Nagano (JP); Wataru Shimizu, Nagano (JP); Kazuyoshi Okada, Nagano (JP)

(73) Assignee: Shinshu University, Nagano (JP)

( * ) Notice: Subject to any disclaimer, the term of this patent is extended or adjusted under 35 U.S.C. 154(b) by 35 days.

(21) Appl. No.: 14/006,766

(22) PCT Filed: Aug. 8, 2011

(86) PCT No.: PCT/JP2011/004499
 § 371 (c)(1),
 (2), (4) Date: Oct. 24, 2013

(87) PCT Pub. No.: WO2012/127540
 PCT Pub. Date: Sep. 27, 2012

(65) Prior Publication Data
 US 2014/0038811 A1  Feb. 6, 2014

(30) Foreign Application Priority Data

Mar. 24, 2011  (JP) ................................ 2011-066244

(51) Int. Cl.
 B01J 23/42  (2006.01)
 B01J 31/02  (2006.01)
 (Continued)

(52) U.S. Cl.
 CPC .............. B01J 31/0275 (2013.01); B01J 35/06 (2013.01); B01J 23/42 (2013.01); B01J 35/002 (2013.01); B01J 35/0053 (2013.01); B01J 35/006 (2013.01); B01J 35/023 (2013.01); B01J 37/0045 (2013.01); B01J 37/0207 (2013.01); B01J 37/0217 (2013.01); H01M 4/925 (2013.01); Y02E 60/50 (2013.01); B01J 31/0231 (2013.01)
 USPC ........................... 502/339; 502/262; 429/524

(58) Field of Classification Search
 CPC .................................. B01J 23/42; B01J 35/06
 USPC .................... 502/339, 262; 429/524
 See application file for complete search history.

(56) References Cited

U.S. PATENT DOCUMENTS

2008/0166259 A1  7/2008  Kijima et al.
2012/0136164 A1*  5/2012  Ying et al. .................... 549/319

FOREIGN PATENT DOCUMENTS

| JP | 2004-363056 A | 12/2004 |
| JP | 2005-174869 A | 6/2005 |
| JP | 2006-278312 A | 10/2006 |
| JP | 2008-181696 A | 8/2008 |

(Continued)

OTHER PUBLICATIONS

Hong-Hui Wang, et al. Pt Nanoparticle netlike-assembly as highly durable and highly active electrocatalyst for oxygen reduction reaction, Chemical Communications, Feb. 21, 2011, 47, p. 3407-3409, First Published on the web.

*Primary Examiner* — Melvin C Mayes
*Assistant Examiner* — James Corno
(74) *Attorney, Agent, or Firm* — Cowan, Liebowitz & Latman, P.C.; Mark Montague

(57) ABSTRACT

The present invention relates to a metal oxide-platinum compound catalyst comprising 5 to 95 parts by weight of a metal oxide and 95 to 5 parts by weight of platinum as the balance. The platinum has a form to reticulately cover at least a part of a particle of the metal oxide. The wires constituting the platinum mesh have an average wire diameter of 5 nm or smaller.

7 Claims, 35 Drawing Sheets

(51) Int. Cl.
*B01J 35/06* (2006.01)
*B01J 35/00* (2006.01)
*B01J 35/02* (2006.01)
*B01J 37/00* (2006.01)
*B01J 37/02* (2006.01)
*H01M 4/92* (2006.01)

(56) References Cited

FOREIGN PATENT DOCUMENTS

| | | |
|---|---|---|
| JP | 2008-201602 A | 9/2008 |
| JP | 2009-524567 A | 7/2009 |
| WO | 2007/061945 A2 | 5/2007 |

* cited by examiner (A)

(B)

(C)

METAL OXIDE-PLATINUM COMPOUND CATALYST AND METHOD FOR PRODUCING SAME

TECHNICAL FIELD

The present invention relates to a metal oxide-platinum composite catalyst in which a platinum catalyst is carried on a metal oxide, and a method for manufacturing the same.

BACKGROUND ART

Platinum is, because of its processability, heat resistance, oxidation resistance, corrosion resistance and electrochemical properties, utilized not only for decorative articles but also as various types of industrial materials for circuit contact materials, exhaust gas cleaning catalysts, fuel cell electrode catalysts, gas reforming catalysts, photocatalysts, solar cells and the like. When platinum is used as a catalyst, for example, platinum is carried in a particulate form on a support according to the purpose. Since platinum is an expensive noble metal, for example, an active surface area of platinum is attempted to be increased by using platinum in a nanoparticle form of about 1 to 10 nm in diameter in order to raise the utilization efficiency as a catalyst; and also a carrier is desired to have a high specific surface area.

Platinum nanoparticles are used in such a manner by being carried on various types of carriers, and the utility of platinum catalysts largely varies depending on carriers to be used and carrying means. For example, in a fuel cell catalyst, an electrode material is used in which a carrier to be used is usually a carbon particle having a high current collecting capability and a large specific surface area, and nano-particulated platinum is carried in a highly dispersed state. Also in a photocatalyst, it has been known that a catalytic activity is improved by carrying platinum carried on titanium oxide.

However, for example, carbon carriers oxidatively corrode by long-term operation and repeated voltage amplitudes due to load variations and start-and-stops of batteries. Additionally, platinum nanoparticles carried in a highly dispersed state enlarge their form by repetition of aggregation, and cause reduction of the active surface area and a large decrease of the initial efficiency. Therefore, means are proposed which use, as carriers, nanoparticles of corrosion-resistive metal oxides such as titania and alumina (see Patent Literature 1), silica (see Patent Literature 2) or tungsten (see Patent Literature 3) by compositing these nanoparticles with carbon.

CITATION LIST

Patent Literature

Patent Literature 1:
Japanese Patent Laid-Open Publication No. 2008-181696
Patent Literature 2:
Japanese Patent Laid-Open Publication No. 2004-363056
Patent Literature 3:
Japanese Patent Laid-Open Publication No. 2005-174869

SUMMARY OF INVENTION

Technical Problem

However, in the above-mentioned conventional technologies, although oxide particles suppress oxidative corrosion of carriers, there is still a problem of causing oxidative corrosion of the carriers as long as carbon is used as the carrier. When a corrosion-resistive metal oxide is used as a carrier in place of a carbon carrier, since the electroconductivity of the metal oxide is lower than the electroconductivity of carbon, networks between carriers are hardly formed and there arises a problem of decreasing the catalytic activity.

The present invention has been achieved in order to solve the above-mentioned problems, and aims at providing a platinum-carrying catalyst having a high catalytic activity without using carbon as a carrier.

Solution to Problem

As a result of exhaustive studies in order to achieve the above-mentioned object, the present inventors have succeeded in manufacture of a metal oxide-platinum composite catalyst having a high catalytic activity by using, as a carrier, a nanoparticle of a metal oxide having an extremely high corrosion resistance, and also using a spray method, not an impregnation method, which is usually carried out as a carrying method of platinum particles. The metal oxide-platinum composite catalyst does not cause oxidative corrosion of the carrier, since carbon is not used. Specifically, the present invention is as follows.

In one embodiment of the metal oxide-platinum composite catalyst according to the present invention, the composite catalyst contains 5 to 95 parts by weight of a metal oxide, and 95 to 5 parts by weight of platinum as the balance; the platinum has a form to reticulately cover at least a part of a particle of the metal oxide; and wires constituting the platinum mesh have an average wire diameter of 5 nm or smaller.

In another embodiment according to the present invention, it is more preferable that a fluoro group-containing compound or an alkyl group-containing compound is adsorbed on a surface of the metal oxide, or a reaction product of the compound with the metal oxide is formed thereon.

In another embodiment according to the present invention, it is more preferable that the metal oxide is one or two or more metal oxides selected from silica, zirconia and ceria.

In another embodiment according to the present invention, it is more preferable that the metal oxide-platinum catalyst has a surface having an average contact angle to water of 15 degrees or larger.

One embodiment of the method for manufacturing a metal oxide-platinum composite catalyst according to the present invention includes a dispersion step of dispersing 5 to 95 parts by weight of a metal oxide in a dispersion medium, a dissolution step of dissolving chloroplatinic acid in a solvent containing ethylenediamine so that 95 to 5 parts by weight of platinum is contained as the balance to the metal oxide, a raw material solution preparation step of mixing the metal oxide dispersion solution obtained by the dispersion step and the chloroplatinic acid solution obtained by the dissolution step to thereby prepare a raw material solution, a spray step of spraying the raw material solution on a base material heated to 60 to 200 degrees C., a recovery step of recovering a metal oxide-platinum composite containing the metal oxide and the platinum from the base material, and a baking step of baking the recovered metal oxide-platinum composite under a reducing atmosphere at a temperature equal to or higher than the temperature of the base material in the spray step and 300 degrees C. or lower.

In another embodiment according to the present invention, it is more preferable that the method further includes, after the recovery step, a hydrophobization step in which an alkylsilane compound or an alkoxysilane compound is adsorbed on the surface of the metal oxide-platinum composite, or a reaction product of the compound with the metal oxide is formed thereon.

In another embodiment according to the present invention, it is more preferable that the hydrophobization step uses a fluoro group-containing or alkyl group-containing alkylsilane compound or alkoxysilane compound. It is preferable that the alkylsilane compound or alkoxysilane compound contains chlorine or nitrogen.

The above-mentioned metal oxide-platinum composite catalyst is excellent in the oxygen reductive activity, and is a material extremely excellent in the deterioration resistance, and exhibits particularly a higher oxygen reductive activity per platinum weight than catalysts prepared by the conventional impregnation method. The metal oxide-platinum composite catalyst is particularly a material exhibiting a suitable voltammogram, acquired by cyclic voltammetry, exhibiting peculiar shapes (which each have two peaks) of the anodic current and the cathodic current each between 0 to 0.4 V (vs. RHE).

The spray step in the method for manufacturing a metal oxide-platinum composite catalyst according to the present invention can achieve a form of a platinum catalyst in which the platinum catalyst is dispersed in a reticulately connected state on a metal oxide, whereby the utility factor of the platinum catalyst can be enhanced, and the improvement in the recovery rate and the reduction of the process cost can be achieved as well.

Advantageous Effects of Invention

The present invention can provide a platinum-carrying catalyst having a high catalytic activity without using carbon as the carrier.

DESCRIPTION OF EMBODIMENTS

Then, respective embodiments of the metal oxide-platinum composite catalyst and the method for manufacturing the same according to the present invention will be described.

1. A Metal Oxide-Platinum Composite Catalyst

Figure 1:
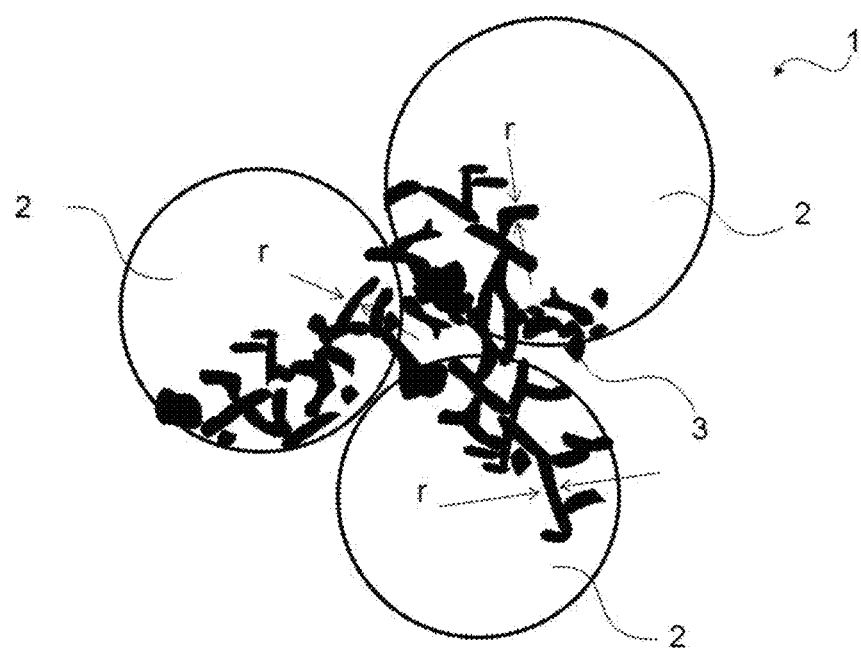
FIG. 1 is an explanatory diagram to illustrate a form of a metal oxide-platinum composite catalyst according to an embodiment of the present invention.

FIG. 1 is an explanatory diagram to illustrate a form of a metal oxide-platinum composite catalyst 1 according to an embodiment of the present invention.

The metal oxide-platinum composite catalyst 1 is a catalyst having a form in which platinum 3 is carried so as to cover at least a part of a metal oxide 2 as a carrier. The platinum 3 is reticulately carried on the metal oxide 2. In the present embodiment, a part of the platinum 3 is chain-like, and has a plurality of branches on one metal oxide 2. A reticulately connecting network of the platinum 3 is formed so as to connect two or more metal oxides 2.

A suitable average wire diameter of wires constituting the mesh of platinum 3 is 5 nm or smaller. In the present specification, the average wire diameter of platinum 3 means, by using a photograph (hereinafter, referred to as a TEM photograph) observed by a transmission microscope, an average value of measured wire diameters at randomly selected 120 points as indicated as "r" in FIG. 1, excluding portions where platinum overlaps with each other (portions photographed in deeper black than the other platinum portions in the TEM photograph) and branching portions.

1.1 A Metal Oxide

The metal oxide 2 is suitably a particulate material having an average particle diameter of 1 to 1,000 nm. Particularly the average particle diameter is preferably in the range of 10 to 500 nm, and more preferably 20 to 300 nm. Here, the average particle diameter of a metal oxide means an average value of 500 measured particle diameters by using a TEM photograph. Examples of metals of the metal oxides are Li, Al, Si, P, B, Ti, V, Cr, Mn, Fe, Co, Ni, Cu, Zn, Nb, Mo, Ru, Pb, Ag, Cd, In, Sn, Sb, W and Ce. The metal oxide is an oxide represented, for example, by $M_xO_z$, $A_xM_yO_z$, $M_x(DO_4)_y$, $A_xM_y(DO_4)_z$ (here, M: a metallic element, A: an alkaline metal or a lanthanide element, D: Be, B, Si, P, Ge or the like), and may be a solid solution thereof. The metal oxide is preferably metal oxides better in insulation than carbon; among these, suitably usable are silica, zirconia, ceria, titania and tin oxide, and further among these, more suitably usable are silica, zirconia and ceria. In the case of using silica as the metal oxide, particularly colloidal silica can suitably be used. In the case of using zirconia, ceria, titania or tin oxide as the metal oxide, particularly a dispersion liquid of microparticle thereof can suitably be used.

1.2 Platinum

The platinum 3 suitably has a reticulately connecting form having an active specific surface area of 2 to 60 $m^2/g$. Here, the "active specific surface area (ECSA)" of the platinum 3 can be calculated from a hydrogen elimination wave in CV. Specifically, since hydrogen is conceivably eliminated during sweeping of the voltage value in the positive direction in the range of 0 to 0.4 V vs. RHE, by taking the area (integrated value) as a charge amount $Q_H$ (μC) necessary for hydrogen unimolecular adsorption layer elimination, and taking the charge amount of adsorbed hydrogen on per platinum unit area to be 210 (μC/cm$^2$), the active specific surface area of the platinum can be determined from $Q_H/(210 \times$ platinum-carried amount). Platinum preferably has an active specific surface area of 2 to 60 $m^2/g$, and high crystallinity.

The weight of platinum 3 accounted for in the metal oxide-platinum composite catalyst 1 is in the range of 5 to 95 wt %, and is preferably as small as possible from the viewpoint of manufacture cost. However, since platinum has requirements of having a high oxygen reductive activity as a catalyst and also forming networks by mutual contact of platinum, the amount of the platinum 3 carried is preferably as small as possible as far as these requirements are satisfied. With a larger average particle diameter of the metal oxide 2, the platinum 3 is likely to have a high oxygen reductive activity as a catalyst even if the amount of the platinum 3 carried is small.

1.3 Hydrophobicity of the Metal Oxide-Platinum Composite Catalyst

The metal oxide-platinum composite catalyst 1 is more preferably hydrophobic. The degree of hydrophobization can be measured, for example, by molding the metal oxide-platinum composite catalyst 1 into a solid tablet of about 1 mm in thickness and about 1 cm in diameter by a tablet molding machine, and measuring a contact angle using 2 μl of ion exchange distilled water by a contact angle measuring device. The metal oxide-platinum composite catalyst 1 has a contact angle of preferably 15 degrees or larger, and more preferably 30 degrees or larger, as measured by such a method. Although adsorbed water is sometimes present on the surface of the metal oxide 2 because the metal oxide is usually hydrophilic, by hydrophobizing the metal oxide-platinum composite catalyst 1, in the case where the metal oxide-platinum composite catalyst 1 is used for a fuel cell, the diffusion of oxygen gas as a fuel on the surface of the platinum is hardly obstructed due to the adsorbed water. In order to hydrophobize the metal oxide-platinum composite catalyst 1, it is preferable that a silane coupling agent, for example, an alkylsilane compound or alkoxysilane compound, is used, and caused to be adsorbed on the surface of the metal oxide-platinum composite catalyst 1. It is preferable that particularly a fluoro group-containing or alkyl group-containing alkylsilane compound or alkoxysilane compound is adsorbed on the surface of the metal oxide-platinum composite catalyst 1. Other than the adsorption, the hydrophobization may be achieved by presence of a reaction product of the silane coupling agent with a metal oxide.

Use of the metal oxide-platinum composite catalyst 1 having the above-mentioned constitution can achieve a catalyst having no carbon. Therefore, in the above-mentioned metal oxide-platinum composite catalyst 1, the carrier does not oxidatively corrode. Since the platinum 3 reticulately connects among particles of the metal oxide 2 without carbons structuring electroconductive networks, the platinum 3 can structure electroconductive networks. Further since the average wire diameter of platinum chains is as very small as 5 nm or smaller, expensive platinum can efficiently be utilized. Therefore, the above-mentioned metal oxide-platinum composite catalyst 1 has a high oxygen reductive activity.

In the case where the surface of the above-mentioned metal oxide-platinum composite catalyst 1 exhibits a contact angle to water of 15 degrees or larger, adsorbed water is hardly present on the surface. The above-mentioned metal oxide-platinum composite catalyst 1 has, since the diffusion of a fuel gas is scarcely obstructed due to adsorbed water, a high oxygen reductive activity.

1.4 Oxygen Reductive Activity Power

An oxygen reductive reaction is a reaction represented by $O_2+4H_3O^++4e^-\rightarrow 6H_2O$, and the slowness of the reaction presumably causes an activation overvoltage. Therefore, use of an electrode material excellent in the activation power for the oxygen reductive reaction makes the activation overvoltage low. In the present embodiment, by measuring cyclic voltammetry (CV) and linear sweep voltammetry (LSV) by using a potentiostat, a rotating disk electrode and a three-electrode cell, setting a measurement temperature at a predetermined temperature in the range of 40 to 70 degrees C. (for example, 60 degrees C.), and using a sulfuric acid aqueous solution as an electrolyte solution, the oxygen reductive activity of a composite catalyst is examined. For a working electrode, a reference electrode and a counter electrode, preferably used are a catalyst-carrying electrode (gold electrode, glassy carbon electrode or the like), a standard hydrogen electrode and a platinum mesh, respectively.

The measurement condition of CV is preferably such that for example, the scanning rate is 20 to 100 mV/sec; the scanning range is 0.01 to 1.5 V (vs. RHE); and the measurement is carried out after stabilization of 5 to 50 cycles in a sulfuric acid electrolyte solution deaerated with nitrogen gas. The measurement condition of LSV is preferably such that for example, the scanning rate is 3 to 8 mV/sec; the scanning range is 1.5 to 0.01 V (vs. RHE); and the measurement is carried out at 3 to 10 measurement points at a predetermined rotation frequency in the range of 200 to 5,000 rpm in a sulfuric acid electrolyte solution saturated with oxygen gas. The electrolyte solution is not limited to the sulfuric acid electrolyte solution, and may be an electrolyte solution using another acid (perchloric acid or the like).

A suitable metal oxide-platinum composite catalyst 1 according to the present embodiment exhibits two peaks in curves of the anodic current and the cathodic current each between 0 to 0.4 V (particularly between 0 to 0.3 V) in a cyclic voltammogram evaluated by CV at a scanning rate of 20 to 100 mV/sec in the scanning range of 0.01 to 1.5 V (vs. RHE) after stabilization of 5 to 50 cycles in a sulfuric acid electrolyte solution deaerated with nitrogen gas.

The oxygen reductive activity power of the metal oxide-platinum composite catalyst 1 is evaluated by a kinetically-controlled current value per platinum unit mass $i_{k\text{-}mass}$ (A/g) and a kinetically-controlled current value per platinum unit surface area $i_{k\text{-}s}$ (mA/cm$^2$). Specific calculation methods thereof are as follows.

First, current values (i) acquired under the condition of a plurality of rotation frequencies in measurement (voltage: 0.85 V) of LSV are determined. Then, coordinates of values of the ½ power of rotation speeds (ω, unit: rad/sec) converted from the rotation frequencies and values of inverses of the current values (i, unit: A) are plotted on an $\omega^{1/2}$–$i^{-1}$ coordinate system in which $\omega^{1/2}$ is taken on the abscissa (X-axis) and $i^{-1}$ is taken on the ordinate (Y-axis), and a most approximate straight line is drawn (Koutecky-Levich plot) therefrom. As a result, an expression: $1/i=1/i_k+1/0.620\cdot n\cdot F\cdot A\cdot C\cdot D^{2/3}\cdot v^{1/6}\cdot \omega^{1/2}$ can be created. Here, n: the number of reaction electrons, F: Faraday constant, $9.65\times 10^4$ (C/mol), A: a surface area of an electrode (cm$^2$), C: an activity (mol/cm$^3$), D: a diffusion coefficient (cm$^2$/sec), v: a kinematic viscosity of a solution (cm$^2$/sec), and ω: a rotation speed (rad/sec).

Then, $i_k$ is determined from a value of a Y-axis intercept with an extrapolation of the straight line specified by the above expression. A value of the $i_k$ divided by a platinum-carried amount (g) is a kinetically-controlled current value per platinum unit mass $i_{k\text{-}mass}$ (A/g). A value of the $i_k$ divided by a platinum active specific surface area (cm$^2$/g) is a kinetically-controlled current value per platinum unit surface area $i_{k\text{-}s}$ (mA/cm$^2$). The larger the $i_{k\text{-}mass}$ (A/g) and the $i_{k\text{-}s}$ (mA/cm$^2$), the higher the oxygen reductive activity power of a catalyst.

2. A Method for Manufacturing a Metal Oxide-Platinum Composite Catalyst

The metal oxide-platinum composite catalyst 1 can be manufactured by mixing a metal oxide particle and a platinum particle, but suitably and as described later, the composite catalyst 1 is manufactured by mixing a metal oxide-containing material such as a sol or gel containing the metal oxide, or a metal alkoxide with a compound containing platinum (for example, a platinum salt), and drying and baking the mixture.

Figure 2:
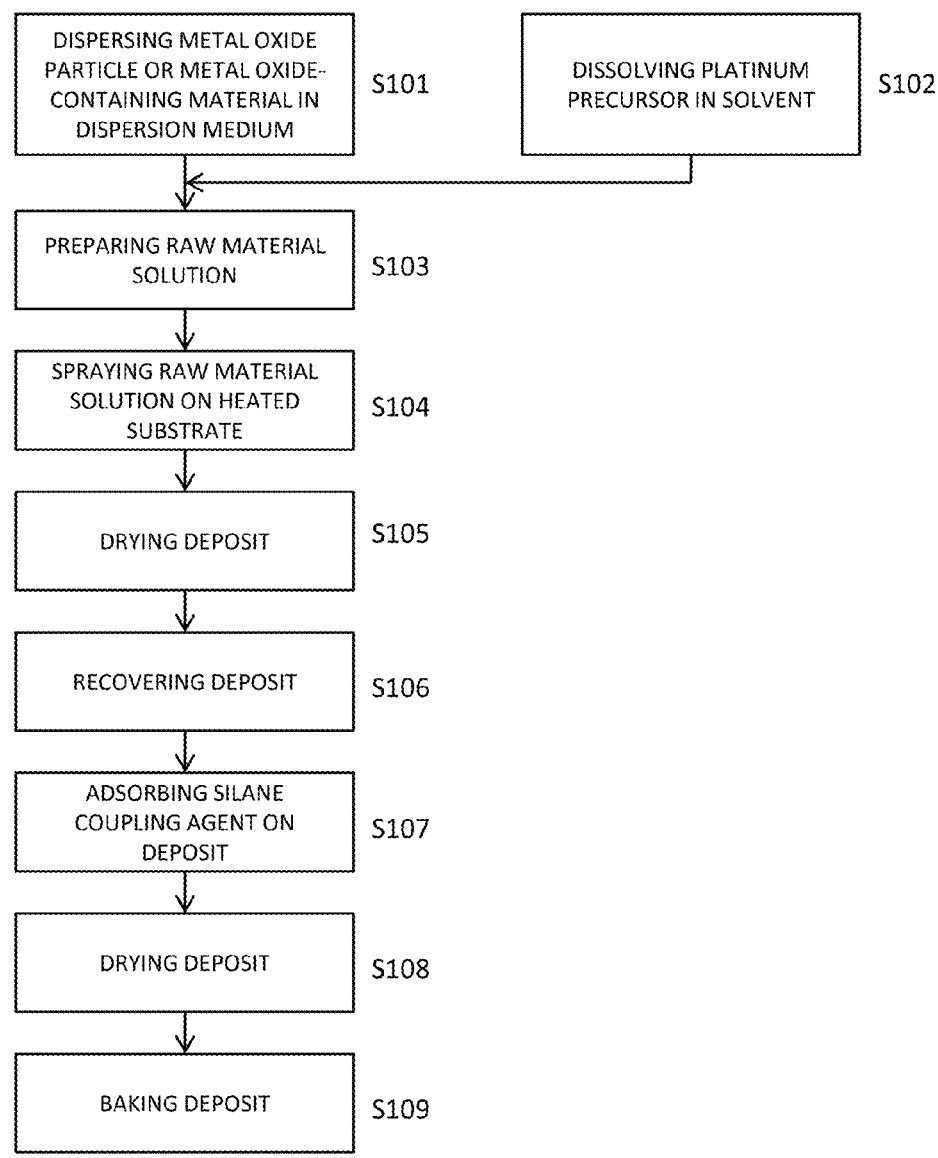
FIG. 2 is a flowchart showing a method for manufacturing a metal oxide-platinum composite catalyst according to an embodiment of the present invention.

FIG. 2 is a flowchart showing a flow of a method for manufacturing the metal oxide-platinum composite catalyst 1 according to an embodiment of the present invention.

2.1 A Dispersion Step

First, a metal oxide particle or a metal oxide-containing material is homogeneously dispersed in a dispersion medium (step S101: dispersion step). In the dispersion step, preferably, the metal oxide particle is mixed in the dispersion medium, and stirred under heating. In the case where the metal oxide is silica, as the metal oxide-containing material, a colloidal silica is suitably used. The disperse media suitably usable are organic solvents represented by alcohols such as methanol, ethanol, propanol and butanol, and ketones such as acetone, and among these, isopropyl alcohol, which is inexpensive, is preferably used.

2.2 A Dissolution Step

Then, chloroplatinic acid (one example of a platinum precursor) is mixed in a solvent containing ethylenediamine until being homogeneously dissolved to prepare a platinum precursor solution (step S102: dissolution step). In the dissolution step, chloroplatinic acid may be dissolved in ethylenediamine, or chloroplatinic acid may be dissolved in a solvent to which ethylenediamine has been added. In the dissolution step, use of an ultrasonic wave, or stirring under heating is preferable. The proportion of chloroplatinic acid can suitably be changed so that the weight ratio of platinum accounted for in the metal oxide-platinum composite catalyst 1 becomes 5 to 95 wt %, and more preferably 10 to 50 wt %.

The chloroplatinic acid suitably usable is, for example, chloroplatinic acid hexahydrate. Use of chloroplatinic acid can provide a metal oxide-platinum composite catalyst 1 having a high activity. The organic solvents usable to dissolve chloroplatinic acid are ethanol, propanol, acetone and the like. Among these, use of ethylenediamine and isopropyl alcohol as a solvent can inexpensively manufacture the metal oxide-platinum composite catalyst 1. The activity of a catalyst can be improved particularly by dissolving chloroplatinic acid by using ethylenediamine, which can form a complex, or using a solvent to which ethylenediamine has been added.

2.3 A Raw Material Solution Preparation Step

The dispersion solution and the solution respectively prepared in the dispersion step and the dissolution step are mixed and stirred to thereby prepare a raw material solution (step S103: raw material solution preparation step).

2.4 A Spray Step

The platinum precursor solution prepared in the above step is charged in a spray container, and sprayed on a substrate in a heated state to 60 to 200 degrees C., preferably 80 to 120 degrees C. to thereby obtain a particulate or bulky metal oxide-platinum composite (step S104: spray step). The platinum precursor solution is solidified on the substrate to make the metal oxide-platinum composite. The heating temperature of the substrate may be out of the above temperature range as long as being a temperature enough to solidify the platinum precursor solution. After the spray step, a drying step (step S105) of drying at 60 to 100 degrees C. may be provided. In place of the spray step and the drying step thereafter, a step of drying the platinum precursor solution by using a commercially available spray drier may be provided.

2.5 A Recovery Step

Then, the substrate is cooled to room temperature, and thereafter, the metal oxide-platinum composite having deposited or not having deposited on the substrate is recovered (step S106: recovery step). When the deposit is peeled off from the substrate, a silicone-made spatula can suitably be used.

2.6 A Hydrophobization Step

Then, the recovered deposit is exposed, under stirring in a hermetically closed desiccator, to a vapor atmosphere of an alkylsilane compound or an alkoxysilane compound for 15 to 200 min (step S107: hydrophobization step). The stirring is preferably carried out at 20 degrees C. at 50 to 150 rpm. By such a step, the alkylsilane compound or the alkoxysilane compound is gas-phase adsorbed on a deposit surface. Any of the alkylsilane compound or the alkoxysilane compound can be used, but particularly a silane coupling agent containing a fluoro group or an alkyl group, which is highly hydrophobic, is preferably used. A drying step (step S108) of drying the hydrophobized deposit may be provided.

2.7 A Baking Step

Then, the recovered metal oxide-platinum composite is heated under a reductive atmosphere at a temperature higher than the temperature of the substrate in the spray step and 300 degrees C. or lower (step S109: baking step). A reducing gas usable is a mixed gas of nitrogen and hydrogen, and is preferably a hydrogen/nitrogen mixed gas containing 10 vol % of hydrogen. In place of the mixed gas of nitrogen gas and hydrogen gas, a mixed gas of argon gas and hydrogen gas may be used. The heating temperature in the baking step may be out of the above temperature range if the state of having a catalytic ability as the metal oxide-platinum composite catalyst 1 is provided. The baking temperature preferably selected is a temperature providing high crystallinity of platinum and capable of holding a fine grain form thereof.

Although the above embodiment has a hydrophobization step, the hydrophobization step is not essential.

EXAMPLES

Hereinafter, the present invention will be described specifically by way of Examples, but the present invention is not limited to these Examples.

First, compounds used in Examples and Comparative Examples and their abbreviations, evaluation methods of metal oxide-platinum composite catalysts, methods for manufacturing metal oxide-platinum composite catalysts, and the evaluation results thereof will be described.

(1) Compounds Used and their Abbreviations

[Silica Particle]
Made by Fuso Chemical Co., Ltd., trade name: "PL-7," average particle diameter: 75 nm, specific gravity: 1.14
[Zirconia Particle]
Made by Sigma-Aldrich Corp., average particle diameter converted from a BET value: 50 nm or smaller, specific gravity: 1.0632
[Platinum Precursors]
Chloroplatinic acid: chloroplatinic acid hexahydrate (made by Wako Pure Chemical Industries, Ltd.)
Platinum salt: tetraammineplatinum (II) chloride hydrate (made by Tanaka Kikinzoku Kogyo K.K., used as a comparison)

[Disperse Media and Solvents]
IPA: isopropyl alcohol (made by Wako Pure Chemical Industries, Ltd.)
EDA: ethylenediamine (made by Wako Pure Chemical Industries, Ltd.)
[Compounds for the Hydrophobization Treatment]
Trimethylchlorosilane (made by Tokyo Chemical Industry Co., Ltd.)
Trifluoropropyltrichlorosilane (made by Gelest, Inc.)
Hexamethyldisilazane (made by Tokyo Chemical Industry Co., Ltd.)

(2) Evaluation Methods

[Observation]

The observation of a metal oxide-platinum composite catalyst was carried out using a transmission electron microscope (made by JEOL Ltd., JEM-2010, hereinafter, referred to as "TEM") under the condition of an acceleration voltage of 200 kV. The wire diameter of platinum was measured by randomly selecting 120 portions excluding portions where platinum overlaps with each other and branching portions from a TEM photograph taken at a magnification of 100,000.

[Measurement of the Oxygen Reductive Activity]

The oxygen reductive activity of a metal oxide-platinum composite catalyst was evaluated by measurements of two electrochemical properties of cyclic voltammetry (hereinafter, referred to as "CV") and linear sweep voltammetry (hereinafter, referred to as "LSV").

The measurements of CV and LSV used a potentiostat (model: HSV100) made by Hokuto Denko Corp. and a three-electrode cell made by Nitto Keisoku KK. The measurement temperature was set at 60 degrees C. and an electrolyte solution used was 0.5 M sulfuric acid (pH: 0.38). The pH regulation of the electrolyte solution was carried out by diluting sulfuric acid made by Wako Pure Chemical Industries, Ltd. with distilled water. A working electrode and a reference electrode used were a Au electrode carrying 10 μg of a catalyst (φ6 mm, 28.26 mm$^2$) and a standard hydrogen electrode made by Micro KK, respectively. A counter electrode used was a Pt mesh (100-mesh, 20 mm×30 mm) made by The Nilaco Corp.

In the measurements of CV and LSV, a working electrode was fabricated by the following method. First, a cylindrical Au electrode (bottom surface diameter: 6 mm) was polished by using a #2000 and a #3000 emery paper (made by Nihon Kenshi Co., Ltd.) in order, and buffed for 5 min by using alumina abrasive agents of 1 μm and 0.05 μm in average particle diameter in order to be thereby finished to a mirror surface. The buffing was carried out by using a polishing machine KENT3 made by Engis Corp. and using an abrasive paper as a waterproof abrasive paper made by Buehler, An ITW Co. After the mirror polishing, the Au electrode was put in distilled water and subjected to ultrasonic cleaning for 2 min, further subjected to ultrasonic cleaning in ethanol for 2 min, and finally put in distilled water and subjected to ultrasonic cleaning for 2 min. Thereafter, the Au electrode was dried at 80 degrees C. for 1 hour, and stored in a desiccator.

Then, 0.1 g of a Nafion (a 5-wt % alcohol-water mixed solution made by Sigma-Aldrich Corp.) and 30 g of ethanol were sufficiently mixed by an ultrasonic treatment for 10 min, and 10 μl of the mixture was fed on the bottom surface of the Au electrode taken out from the desiccator, and dried at 25 degrees C. for 1 hour. Separately, 10 mg of the metal oxide-platinum composite after the baking and 10 ml of an ethanol-water mixed solvent (a solvent having ethanol and distilled water mixed in a proportion of 9:1 in weight ratio) were subjected to an ultrasonic dispersing for 30 min; 10 μl of the dispersion liquid was taken out therefrom, and fed on the bottom surface of the Au electrode after the drying. Thereafter, the fed dispersion liquid was dried at 25 degrees C. for 1 hour, and further dried at 80 degrees C. for 1 hour to thereby make an electrode for test.

The CV measurement was carried out under the conditions of a scanning rate: 50 mV/sec, a scanning range: 0.02 to 1.2 V (vs. RHE), and an atmosphere: in a sulfuric acid electrolyte solution deaerated with nitrogen gas (hereinafter, suitably referred to as "nitrogen-saturated atmosphere"), and the evaluation was carried out after stabilization of 20 cycles.

In the LSV measurement, a rotating disk electrode (RDE) was used and the measurement was carried out by varying the rotation frequency of the electrode. The LSV measurement was carried out under the conditions of a scanning rate: 5 mV/sec, a scanning range: 1.05 to 0.05 V (vs. RHE), and an atmosphere: in a sulfuric acid electrolyte solution saturated with oxygen gas (hereinafter, suitably referred to as "oxygen-saturated atmosphere"), and the evaluation was carried out under each of 6 conditions of rotation frequencies of 500, 1,000, 1,500, 2,000, 2,500 and 3,000 rpm.

The platinum active specific surface area was calculated from a hydrogen elimination wave in CV. Specifically, by taking the area (integrated area) in sweeping the voltage value in the positive direction in the range of 0 to 0.4 V vs. RHE as a charge amount $Q_H$ (μC) necessary for hydrogen unimolecular adsorption layer elimination, and taking the charge amount of adsorbed hydrogen on per platinum unit area to be 210 (μC/cm$^2$), the platinum active specific surface area was determined from a platinum active specific surface area=$Q_H$/(210×platinum-carried amount).

The quantitative evaluation of generation of hydrogen peroxide at a metal oxide-platinum composite catalyst was carried out using a rotating ring disk electrode (RRDE). The current value flowing when hydrogen peroxide generated from the catalyst during the LSV measurement after the CV measurement was captured by a circumferential platinum ring electrode (width: 1 mm, gap between itself and a disk electrode: 0.5 mm) was recorded at all times. The catalyst to be evaluated was carried in a predetermined amount on a glassy carbon disk (φ6 mm, 28.26 mm$^2$) as a working electrode. These electrochemical measurements used a dual potentiostat (model: AUTOLAB) made by Eco Chemie B.V., a rotating disk electrode control system made by Hokuto Denko Corp., and a three-electrode cell made by Nitto Keisoku KK. The measurement temperature was set at 60 degrees C., and an electrolyte solution used was a 0.1 M perchloric acid aqueous solution. The temperature regulation of the electrolyte solution was carried out by diluting perchloric acid (for precise analysis) made by Wako Pure Chemical Industries, Ltd. with distilled water. A reference electrode used was a standard hydrogen electrode made by Micro KK. A counter electrode used was a Pt mesh (100-mesh, 20 mm×30 mm) made by The Nilaco Corp.

The CV measurement for evaluation of generation of hydrogen peroxide of a metal oxide-platinum composite catalyst was carried out under the conditions of a scanning rate of 50 mV/sec, a scanning range of 0.02 to 1.2 V (vs. RHE), and an atmosphere of in a perchloric acid electrolyte solution deaerated with nitrogen gas (hereinafter, suitably referred to as "nitrogen-saturated atmosphere"), and the evaluation was carried out after stabilization of 20 cycles. The LSV measurement was carried out under the conditions of a scanning rate: 5 mV/sec, a scanning range: 1.05 to 0.05 V (vs. RHE), an atmosphere: in a perchloric acid electrolyte solution saturated with oxygen gas (hereinafter, suitably referred to as "oxygen-saturated atmosphere"), and a rotation frequency of 2,000 rpm. At this time, the potential of the ring electrode was regulated at 1.0 V (vs. RHE), and numerical values of currents flowing by the reaction on the electrode were recorded.

(3) Preparation Method and Evaluation Results of Each Sample

<Silica-Platinum Composite Catalysts>

Example 1

Figure 3:
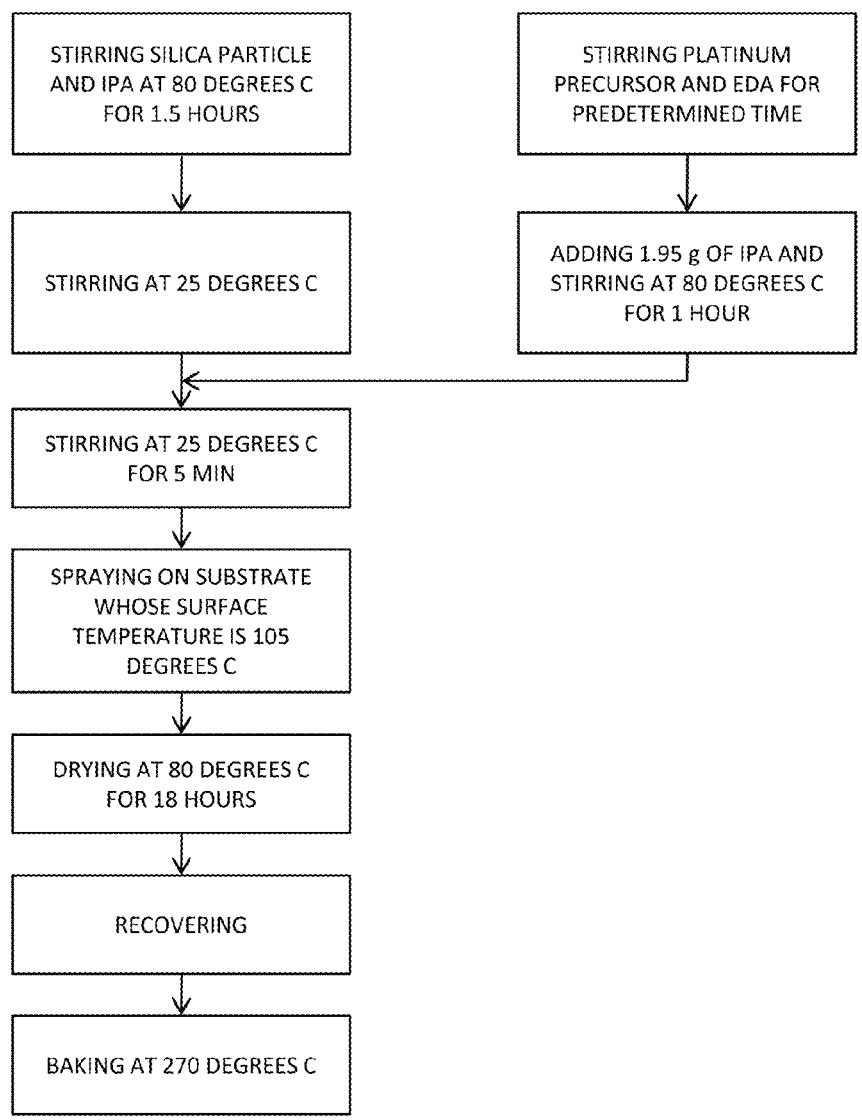
FIG. 3 is a flowchart showing a flow of a method for manufacturing silica-platinum composite catalysts of Example 1 and Example 2.

FIG. 3 is a flowchart showing a flow of a method for manufacturing silica-platinum composite catalysts of Example 1 and Example 2.

0.559 g of PL-7 as a colloidal silica and 3.57 g of IPA were stirred under heating to 80 degrees C. for 1.5 hours, and thereafter stirred at 25 degrees C. 0.341 g of chloroplatinic acid as a platinum precursor and 0.9 g of EDA were charged in another vessel, and stirred for 0.5 hours. 1.95 g of IPA was added thereto, and stirred at 80 degrees C. for 1 hour. Then, the previously prepared IPA dispersion solution of PL-7 was added, and stirred at 25 degrees C. for 5 min to thereby obtain a raw material solution. Then, the raw material solution was charged in a spray container (Colani HA2400) made by Harder & Steenbeck GmbH & Co. KG, and sprayed on a glass substrate whose surface temperature was 105 degrees C. Thereafter, the sprayed raw material solution was dried at 80 degrees C. for 18 hours. An obtained catalyst powder was light yellow. The obtained deposit was recovered, and baked under a mixed gas atmosphere of 10% $H_2$ and 90% $N_2$ at 270 degrees C. An obtained catalyst powder was black.

Example 2

Figure 4:
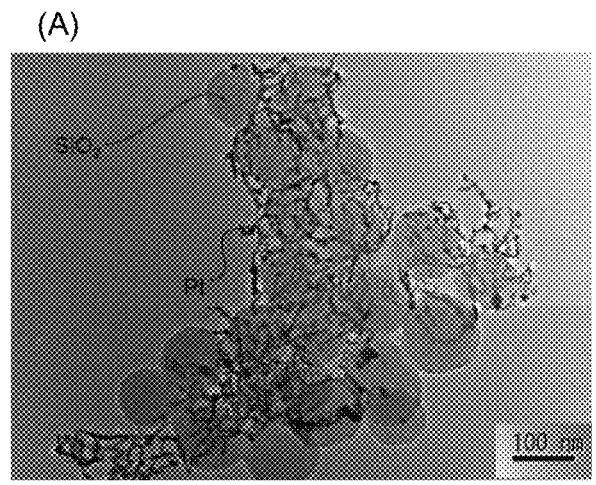
FIG. 4 shows TEM photographs whose magnifications were varied of the silica-platinum composite catalyst prepared under the condition of Example 2.
Figure 4:
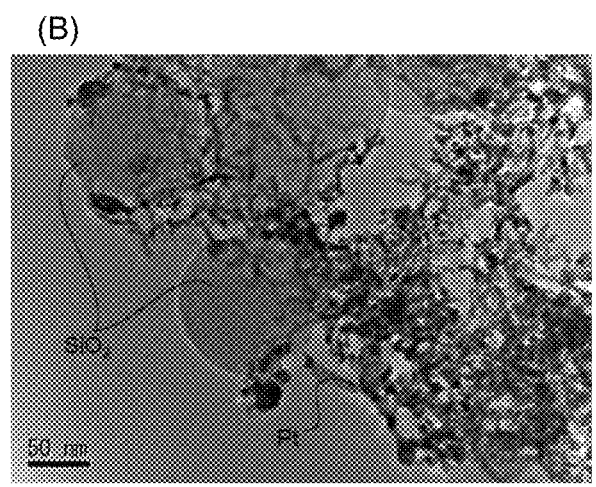
Figure 4:
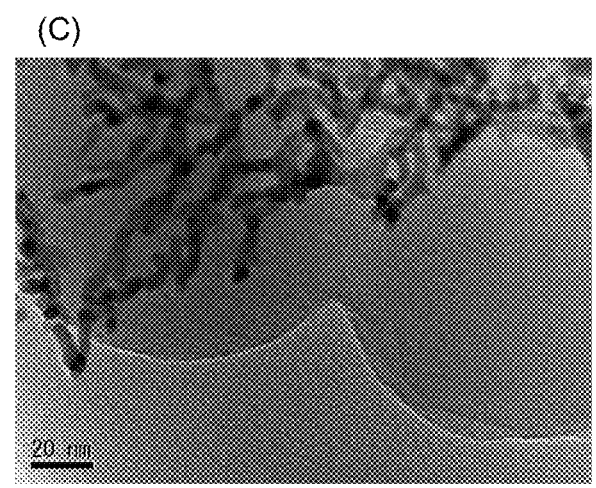
Figure 5:
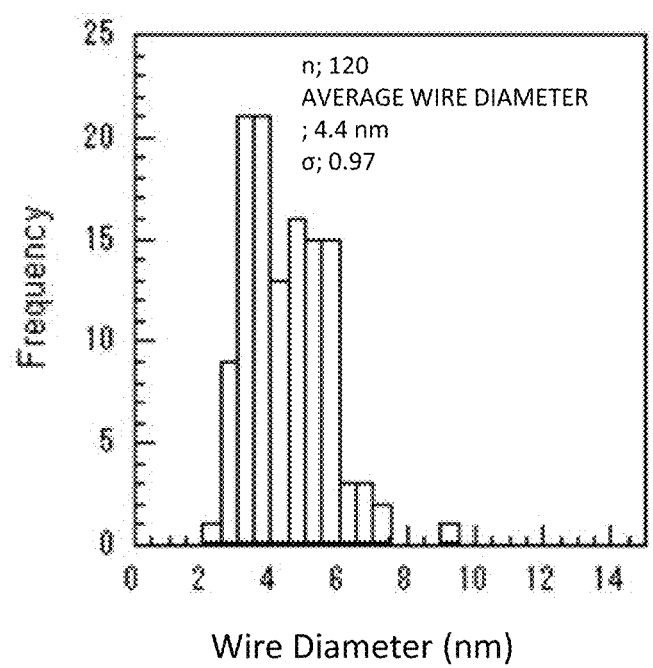
FIG. 5 is a graph showing the wire diameter distribution of platinum chains of the silica-platinum composite catalyst prepared under the condition of Example 2.
Figure 6:
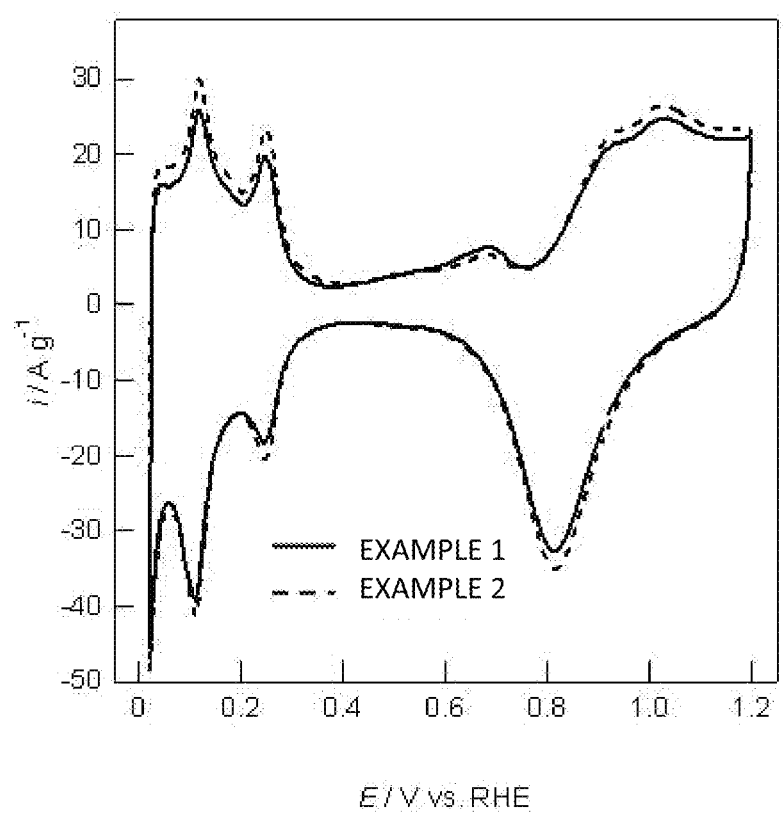
FIG. 6 is a graph showing the CV evaluation results of the respective silica-platinum composite catalysts prepared under the conditions of Example 1 and Example 2.
Figure 7:
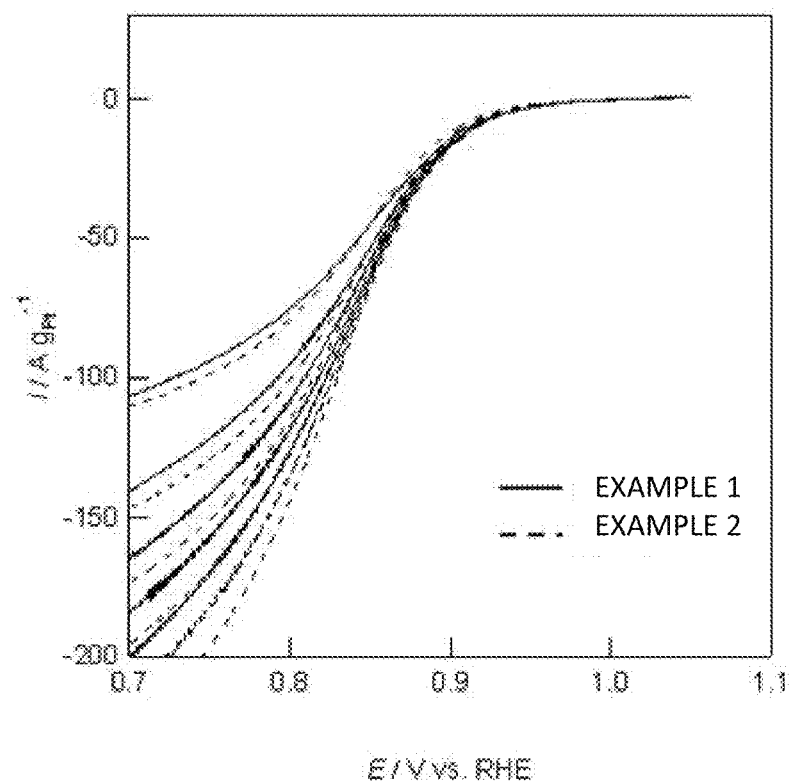
FIG. 7 is a graph showing the LSV evaluation results of the respective silica-platinum composite catalysts prepared under the conditions of Example 1 and Example 2.

In Example 2, a sample obtained by altering the stirring time of the solution of chloroplatinic acid and EDA from 0.5 hours to 24 hours in the method for manufacturing the sample of Example 1 was used. An obtained catalyst powder was black. FIG. 4 ((A) to (C)) shows TEM photographs whose magnifications were varied of the silica-platinum composite catalyst prepared under the condition of Example 2. FIG. 5 is a graph showing a wire diameter distribution of platinum chains of the silica-platinum composite catalyst prepared under the condition of Example 2. FIG. 6 is a graph showing CV evaluation results of the respective silica-platinum composite catalysts prepared under the conditions of Example 1 and Example 2. FIG. 7 is a graph showing LSV evaluation results of the respective silica-platinum composite catalysts prepared under the conditions of Example 1 and Example 2.

Comparative Example 1

Figure 8:
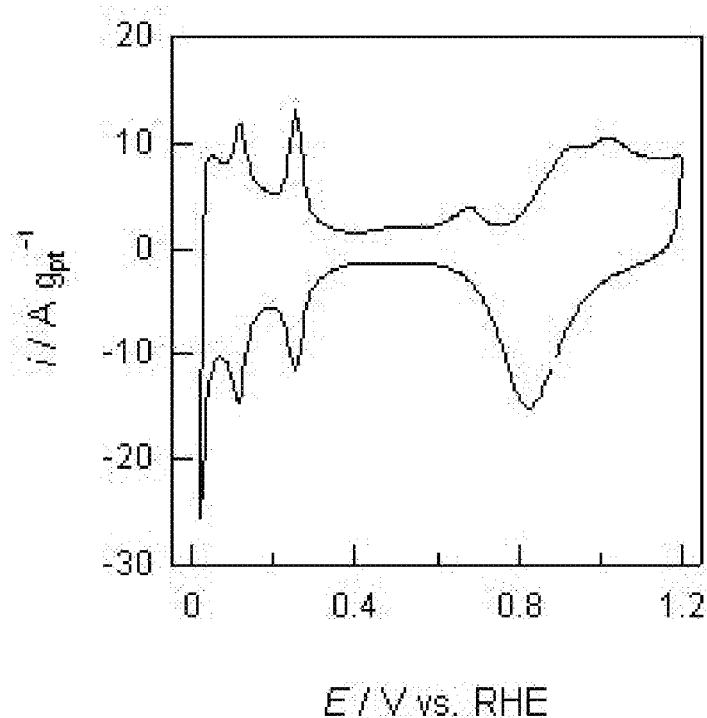
FIG. 8 is a graph showing the CV evaluation result of the silica-platinum composite catalyst prepared under the condition of Comparative Example 1.
Figure 9:
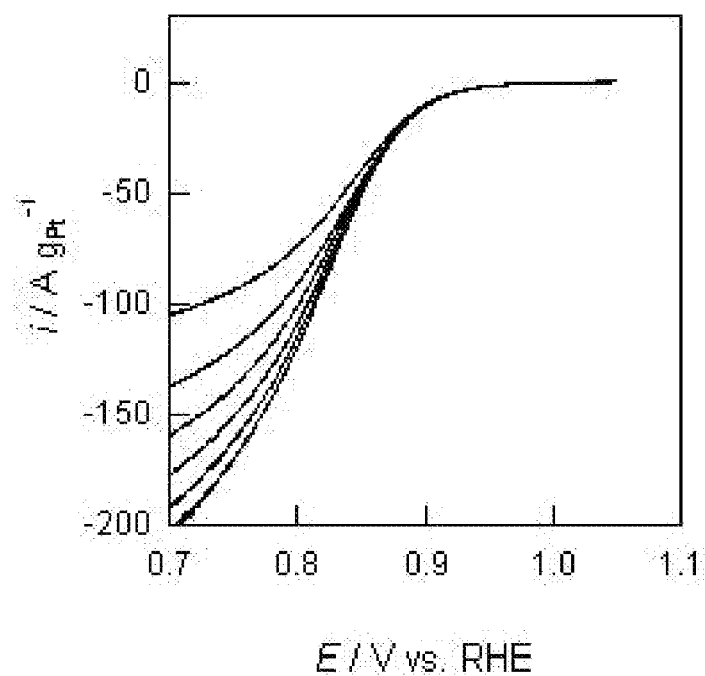
FIG. 9 is a graph showing the LSV evaluation result of the silica-platinum composite catalyst prepared under the condition of Comparative Example 1.

The method for preparing the platinum precursor in the method for manufacturing the sample of Example 1 was changed. Specifically, 0.232 g of tetraammineplatinum (II) chloride hydrate was used in place of chloroplatinic acid, and 2.5 g of pure water and 1.95 g of IPA were added thereto; and the mixture was dissolved by an ultrasonic wave, and added to the IPA dispersion liquid of PL-7. FIG. 8 is a graph showing a CV evaluation result of the silica-platinum composite catalyst prepared under the condition of Comparative Example 1. FIG. 9 is a graph showing an LSV evaluation result of the silica-platinum composite catalyst prepared under the condition of Comparative Example 1. Properties of the silica-platinum composite catalysts of Examples 1 and 2 and Comparative Example 1 acquired by FIGS. 6 to 9 are collectively shown in Table 1.

TABLE 1

| Sample | Platinum Active Specific Surface Area m²/g | Kinetically-Controlled Current Value per Platinum Mass at 0.85 V ik-mass @ 0.85 V A/g | Kinetically-Controlled Current Value per Platinum Mass at 0.80 V ik-mass @ 0.80 V A/g | Kinetically-Controlled Current Value per Platinum Mass at 0.75 V ik-mass @ 0.75 V A/g | Kinetically-Controlled Current Value per Platinum Active Specific Surface Area at 0.85 V ik-s @ 0.85 V mA/cm² |
|---|---|---|---|---|---|
| Example 1 | 42.5 | 100.6 | 287.1 | 507.9 | 0.24 |
| Example 2 | 37.5 | 99.5 | 318.8 | 604.8 | 0.27 |
| Comparative Example 1 | 18.5 | 66.8 | 203.8 | 378.9 | 0.36 |

In Examples 1 and 2, different from Comparative Example 1, no water was added. As a result, water contained in the raw material solution (contained in PL-7 and chloroplatinic acid): IPA was 0.43:9.57. As shown in FIGS. 6 and 8, in the silica-platinum composite catalysts of Examples 1 and 2 and Comparative Example 1, anodic and cathodic currents each exhibited a peculiar shape having two peaks between 0 to 0.3 V (vs. RHE). Thus having two large peaks means that there are present two main potentials at which hydrogen is eliminated and the surface area of the platinum is large. Since the hydrogen elimination energies are different depending on the crystal planes of platinum, it is conceivable that the platinum carried on the silica-platinum composite catalysts manufactured in these Examples expose mainly two crystal planes, and the proportion of the surface areas taken by these out of the surface area of the whole platinum is large.

As shown in FIG. 5, the average wire diameter of platinum chains in the silica-platinum composite catalyst of Example 2 was 4.4 nm. As shown in Table 1, the platinum active specific surface areas of the silica-platinum composite catalysts of Examples 1 and 2 were lager nearly by two times than the platinum active specific surface area of the sample of the silica-platinum composite catalyst of Comparative Example 1. Further in the silica-platinum composite catalysts of Examples 1 and 2, $i_{k\text{-}mass}$, for example, at 0.85 V, was larger nearly by 1.5 times than $i_{k\text{-}mass}$ of the silica-platinum composite catalyst of Comparative Example 1.

Figure 10:
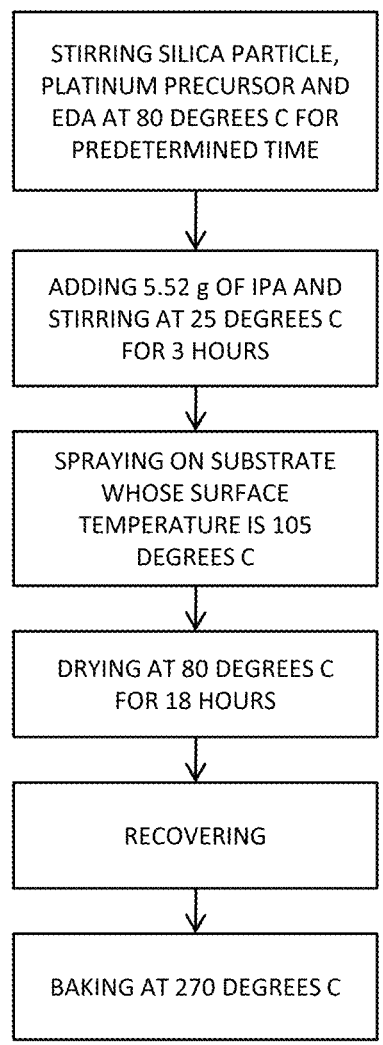
FIG. 10 is a flowchart showing a flow of a method for manufacturing silica-platinum composite catalysts of Comparative Example 2 and Comparative Example 3.

FIG. 10 is a flowchart showing a flow of a method for manufacturing silica-platinum composite catalysts of Comparative Example 2 and Comparative Example 3.

Comparative Example 2

0.559 g of PL-7, 0.341 g of chloroplatinic acid and 0.9 g of EDA were mixed and stirred at 80 degrees C. for 5 min. 5.52 g of IPA was added thereto, and stirred at 25 degrees C. for 3 hours to thereby obtain a raw material solution. The raw material solution was sprayed on the surface of a substrate whose surface temperature was 105 degrees C., and thereafter dried at 80 degrees C. for 18 hours. An obtained catalyst powder was light orange. The obtained deposit was recovered, and baked under a mixed gas atmosphere of 10% $H_2$ and 90% $N_2$ at 270 degrees C. An obtained catalyst powder was black.

Comparative Example 3

Figure 11:
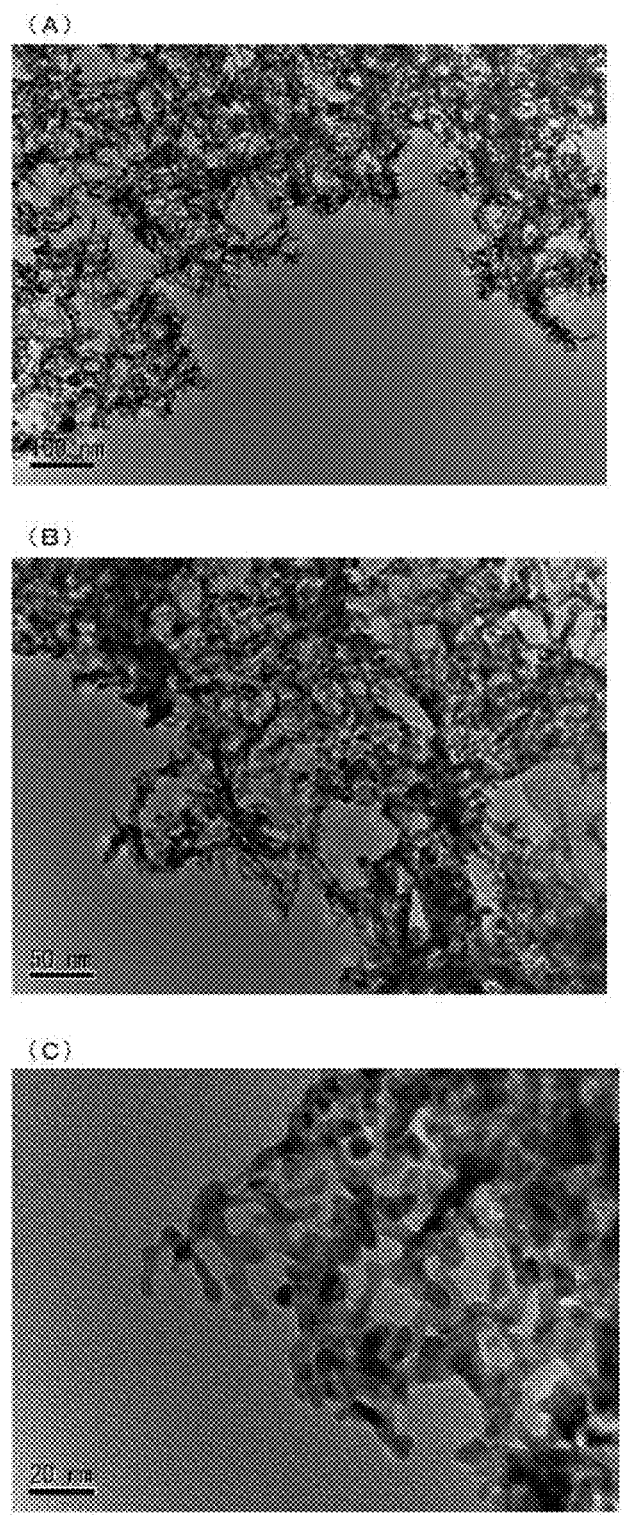
FIG. 11 shows TEM photographs whose magnifications were varied of the silica-platinum composite catalyst prepared under the condition of Comparative Example 3.
Figure 12:
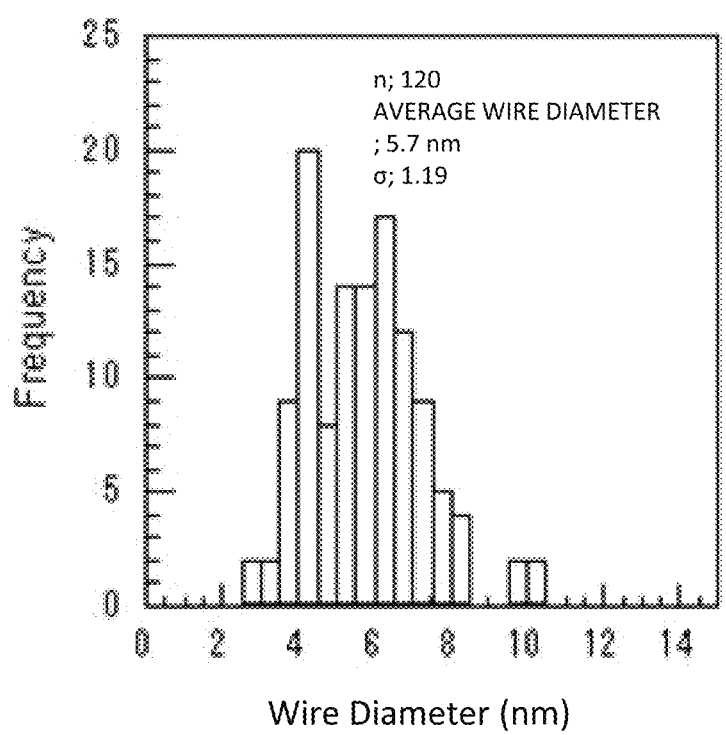
FIG. 12 is a graph showing a wire diameter distribution of platinum chains of the silica-platinum composite catalyst prepared under the condition of Comparative Example 3.
Figure 13:
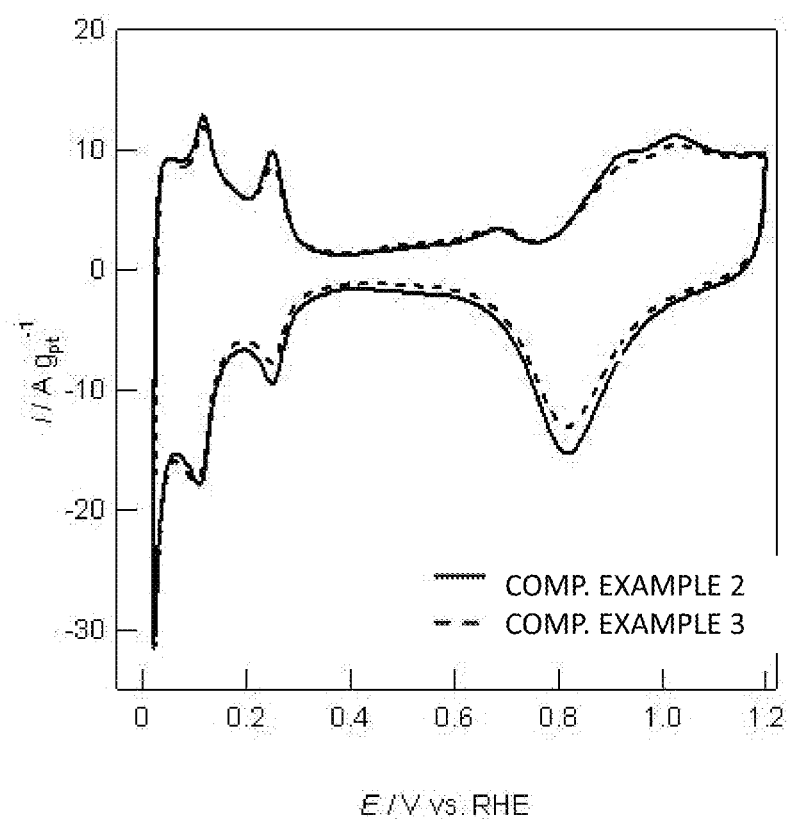
FIG. 13 is a graph showing the CV evaluation results of the respective silica-platinum composite catalysts prepared under the conditions of Comparative Example 2 and Comparative Example 3.
Figure 14:
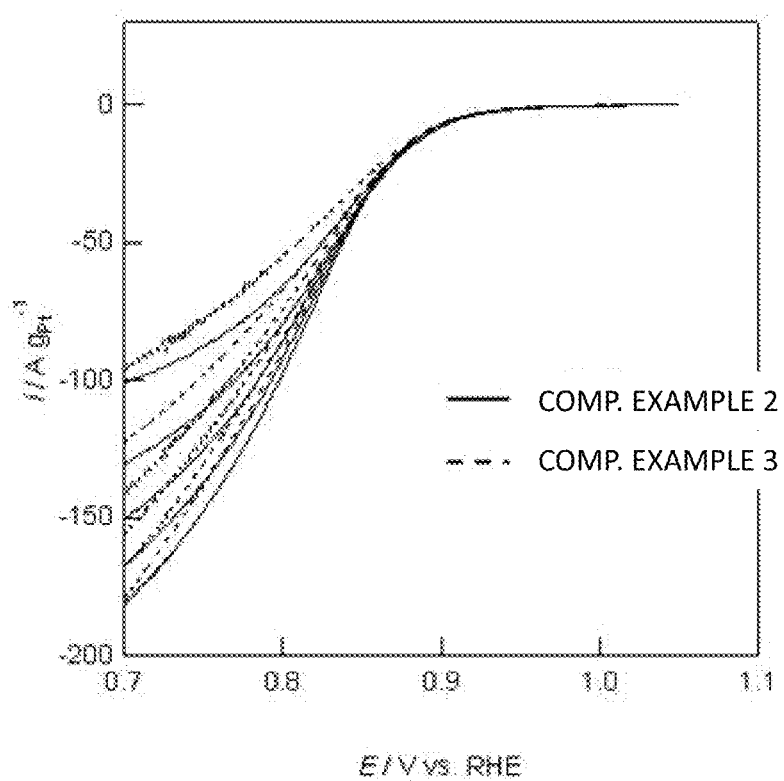
FIG. 14 is a graph showing the LSV evaluation results of the respective silica-platinum composite catalysts prepared under the conditions of Comparative Example 2 and Comparative Example 3.

In Comparative Example 3, a sample obtained by altering the stirring time of the mixed solution of PL-7, chloroplatinic acid and EDA from 5 min to 20 min in the manufacturing method of Comparative Example 2. An obtained catalyst powder was black was used. FIG. 11 ((A) to (C)) shows TEM photographs whose magnifications were varied of the silica-platinum composite catalyst prepared under the condition of Comparative Example 3. FIG. 12 is a graph showing a wire diameter distribution of platinum chains of the silica-platinum composite catalyst prepared under the condition of Comparative Example 3. FIG. 13 is a graph showing CV evaluation results of the respective silica-platinum composite catalysts prepared under the conditions of Comparative Example 2 and Comparative Example 3. FIG. 14 is a graph showing LSV evaluation results of the respective silica-platinum composite catalysts prepared under the conditions of Comparative Example 2 and Comparative Example 3. Properties of the silica-platinum composite catalysts of Comparative Examples 2 and 3 acquired by FIGS. 13 and 14 are collectively shown in Table 2.

TABLE 2

| Sample | Platinum Active Specific Surface Area m²/g | Kinetically-Controlled Current Value per Platinum Mass at 0.85 V ik-mass @ 0.85 V A/g | Kinetically-Controlled Current Value per Platinum Mass at 0.80 V ik-mass @ 0.80 V A/g | Kinetically-Controlled Current Value per Platinum Mass at 0.75 V ik-mass @ 0.75 V A/g | Kinetically-Controlled Current Value per Platinum Active Specific Surface Area at 0.85 V ik-s @ 0.85 V mA/cm² |
|---|---|---|---|---|---|
| Comparative Example 2 | 16.7 | 43.5 | 147.9 | 304 | 0.26 |
| Comparative Example 3 | 18.3 | 41.9 | 162.7 | 315 | 0.23 |

As shown in FIG. 12, the average wire diameter of platinum chains of the silica-platinum composite catalyst of Comparative Example 3 was 5.7 nm. As shown in Table 2, the platinum active specific surface areas of the silica-platinum composite catalysts of Comparative Examples 2 and 3 were smaller than the platinum active specific surface areas of those of Examples 1 and 2. As shown in FIG. 12, the silica-platinum composite catalysts of Comparative Examples 2 and 3 had broader wire diameter distributions and shorter chain lengths than the samples of Examples 1 and 2. As shown in FIG. 11, since many of platinum chain portions of the silica-platinum composite catalyst of Comparative Example 3 are photographed in deep black, it is conceivable that there occurs much aggregation of the platinum.

Comparing the results of Examples 1 and 2 to the results of Comparative Examples 2 and 3, it was found that the employment of the method for manufacturing silica-platinum composite catalysts of Examples 1 and 2, which had a dispersion step of dispersing a silica particle, a dissolution step of dissolving a platinum precursor and a raw material solution preparation step of mixing these, made the platinum chains thinner, the aggregation little, and $i_{k\text{-}mass}$ large.

Figure 15:
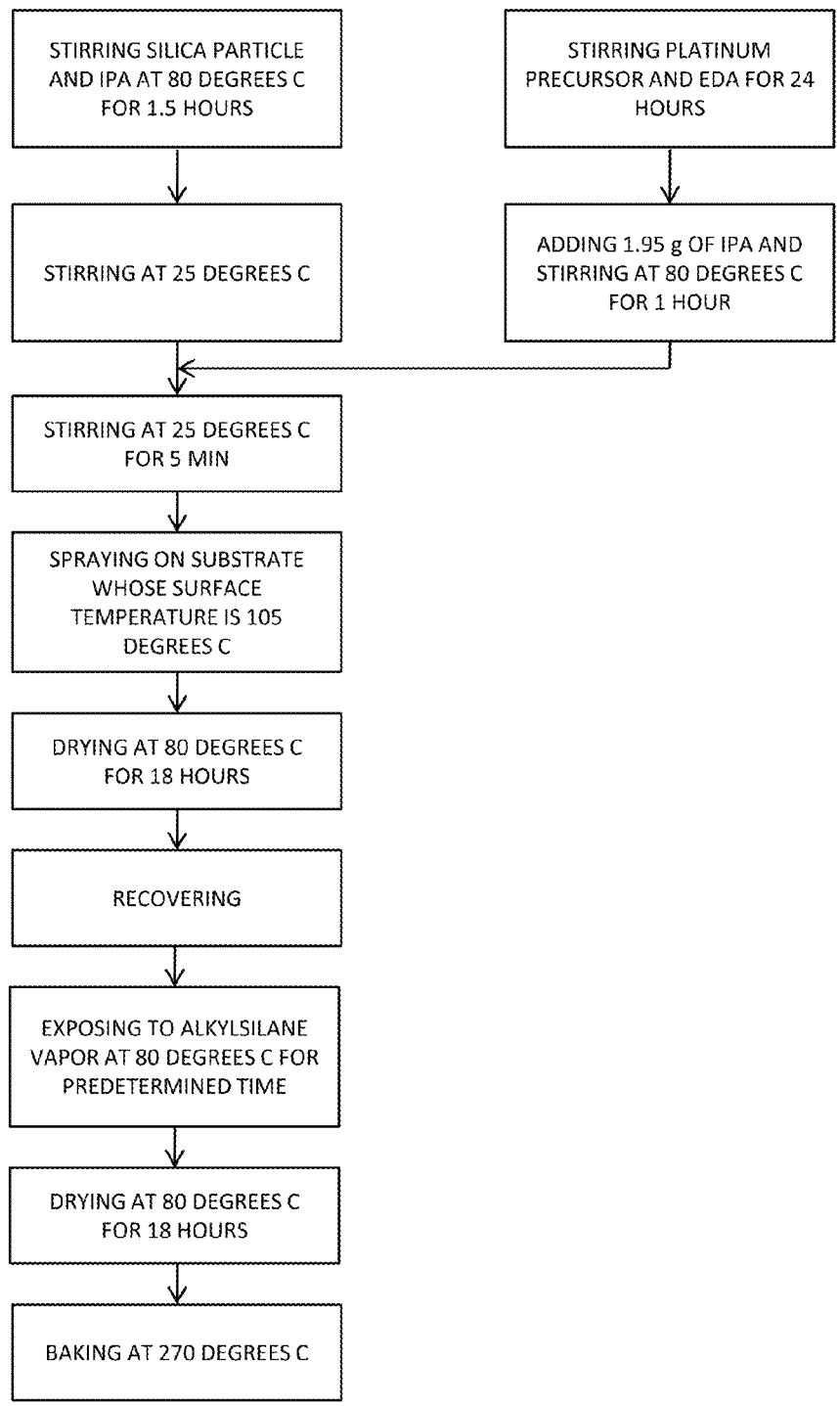
FIG. 15 is a flowchart showing a flow of a method for manufacturing silica-platinum composite catalysts of Examples 3 to 5.

FIG. 15 is a flowchart showing a flow of a method for manufacturing silica-platinum composite catalysts of Examples 3 to 5.

Examples 3 to 5

Figure 16:
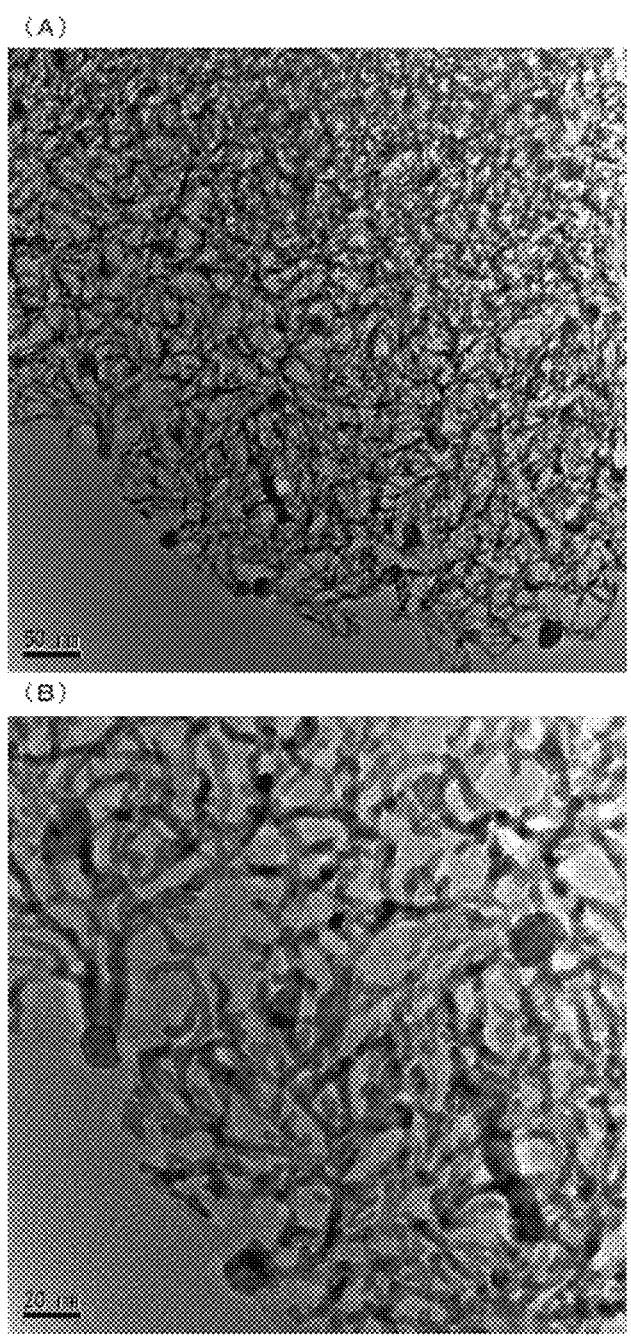
FIG. 16 shows TEM photographs whose magnifications were varied of the silica-platinum composite catalyst prepared under the condition of Example 3.
Figure 17:
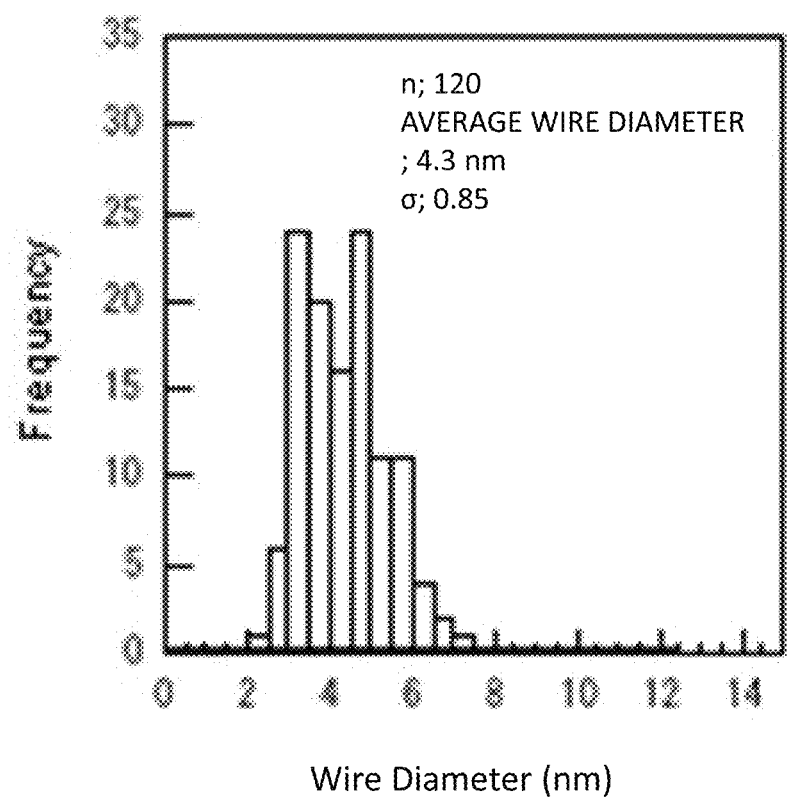
FIG. 17 is a graph showing a wire diameter distribution of platinum chains of the silica-platinum composite catalyst prepared under the condition of Example 3.
Figure 18:
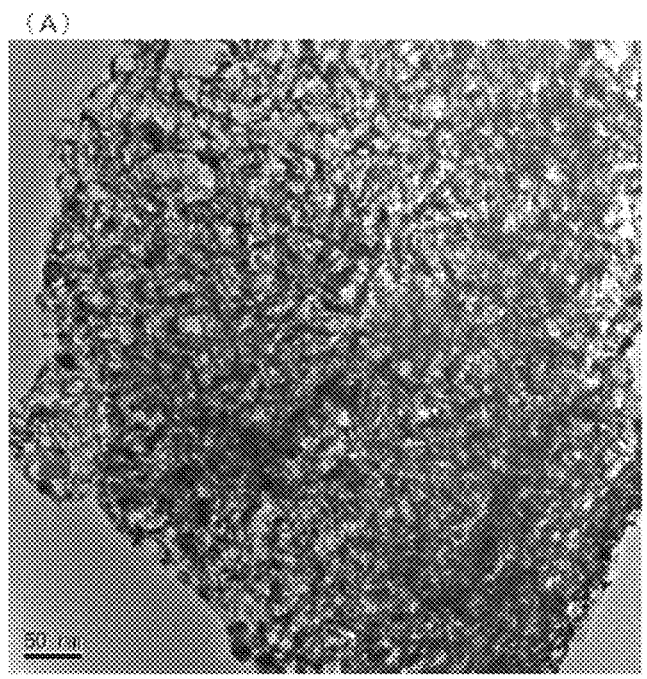
FIG. 18 shows TEM photographs whose magnifications were varied of the silica-platinum composite catalyst prepared under the condition of Example 4.
Figure 18:
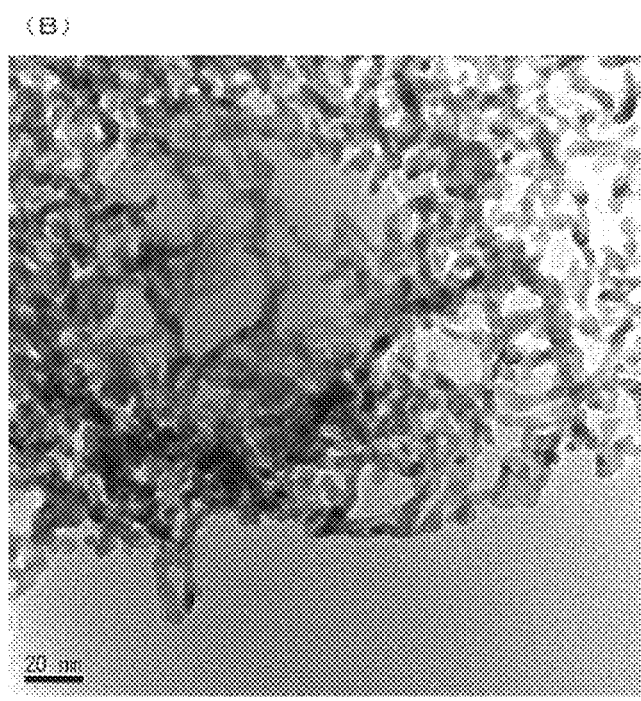
Figure 19:
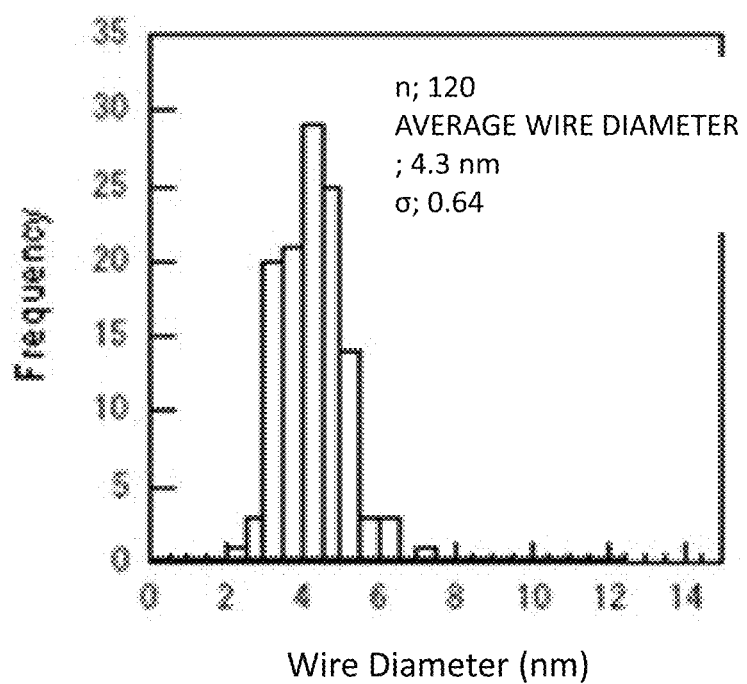
FIG. 19 is a graph showing a wire diameter distribution of platinum chains of the silica-platinum composite catalyst prepared under the condition of Example 4.
Figure 20:
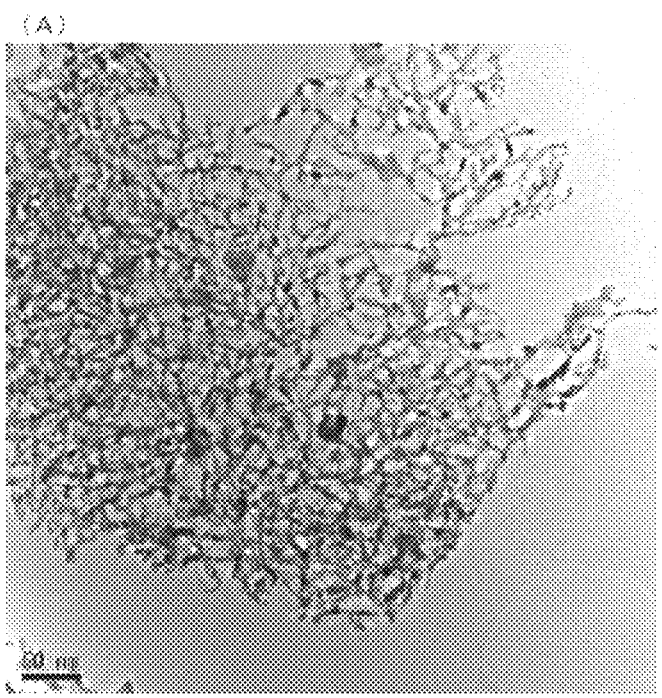
FIG. 20 shows TEM photographs whose magnifications were varied of the silica-platinum composite catalyst prepared under the condition of Example 5.
Figure 20:
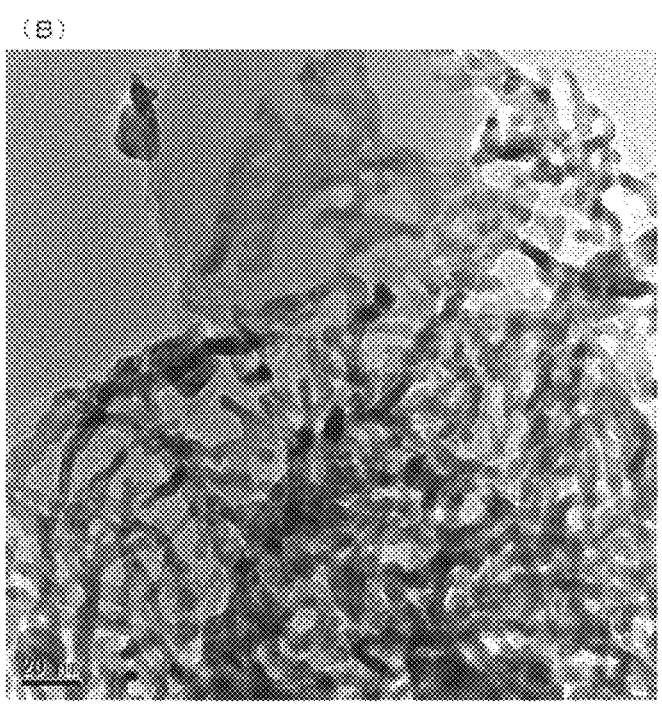
Figure 21:
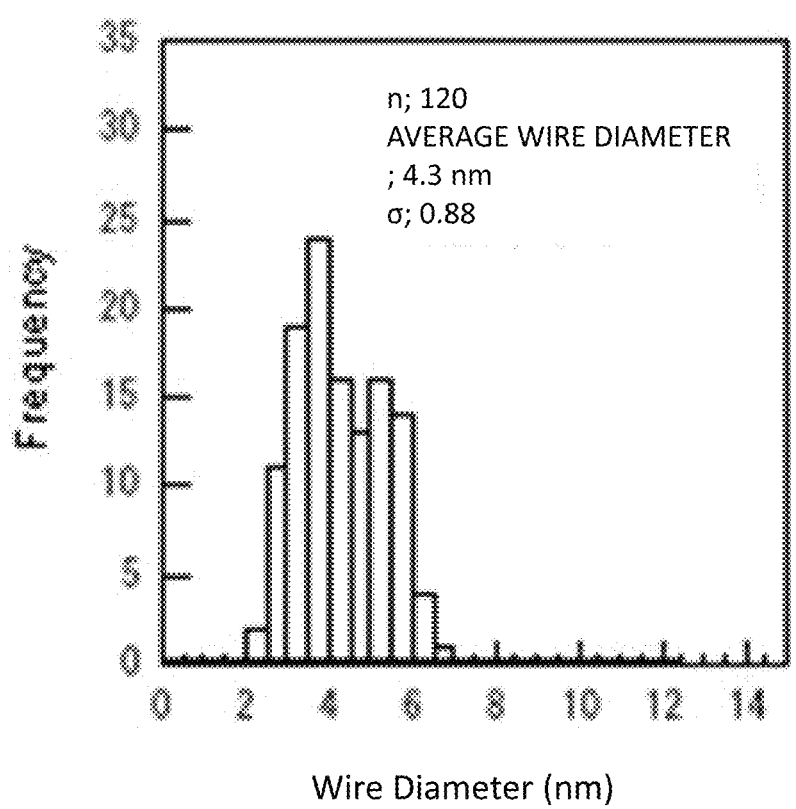
FIG. 21 is a graph showing the wire diameter distribution of platinum chains of a silica-platinum composite catalyst prepared under the condition of Example 5.

Methods for manufacturing samples of Examples 3 to 5 were the same as that of Example 2 until the step of recovering a powder. A deposit was recovered by the recovery step, and thereafter exposed to a vapor atmosphere of a compound shown in Table 3 for a predetermined time under stirring at a rotation frequency of 100 rpm in a hermetically closed desiccator of 20 degrees C. This step hydrophobized the surface of the deposit. The hydrophobized deposit was dried at 80 degrees C. for 18 hours, and baked in a mixed gas atmosphere of 10% $H_2$ and 90% $N_2$ at 270 degrees C. FIG. 16 is TEM photographs whose magnifications were varied of the silica-platinum composite catalyst prepared under the condition of Example 3. FIG. 17 is a graph showing a wire diameter distribution of platinum chains of the silica-platinum composite catalyst prepared under the condition of Example 3. FIG. 18 shows TEM photographs whose magnifications were varied of the silica-platinum composite catalyst prepared under the condition of Example 4. FIG. 19 is a graph showing a wire diameter distribution of platinum chains of the silica-platinum composite catalyst prepared under the condition of Example 4. FIG. 20 shows TEM photographs whose magnifications were varied of the silica-platinum composite catalyst prepared under the condition of Example 5. FIG. 21 is a graph showing a wire diameter distribution of platinum chains of the silica-platinum composite catalyst prepared under the condition of Example 5.

TABLE 3

| Sample | Name of Compound for Hydrophobization | Time for Hydrophobization (min) |
| --- | --- | --- |
| Example 3 | trimethylchlorosilane | 30 |
| Example 4 | trifluoropropyltrichlorosilane | 30 |
| Example 5 | trifluoropropyltrichlorosilane | 120 |

Figure 22:
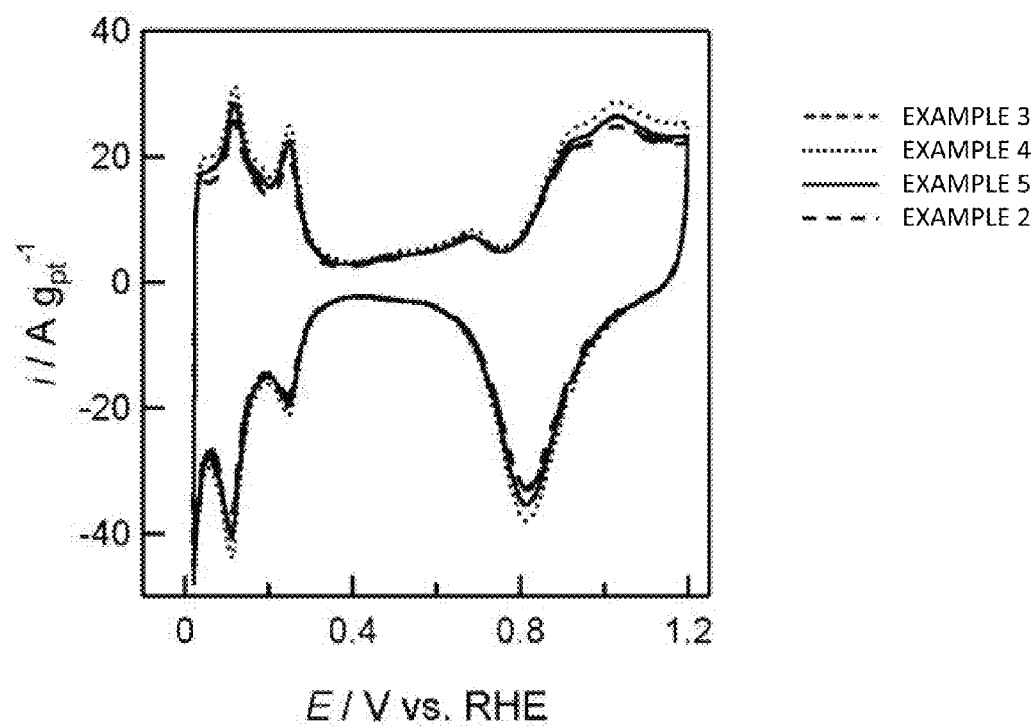
FIG. 22 is a graph showing the CV evaluation results of respective silica-platinum composite catalysts prepared under the conditions of Examples 3 to 5.
Figure 23:
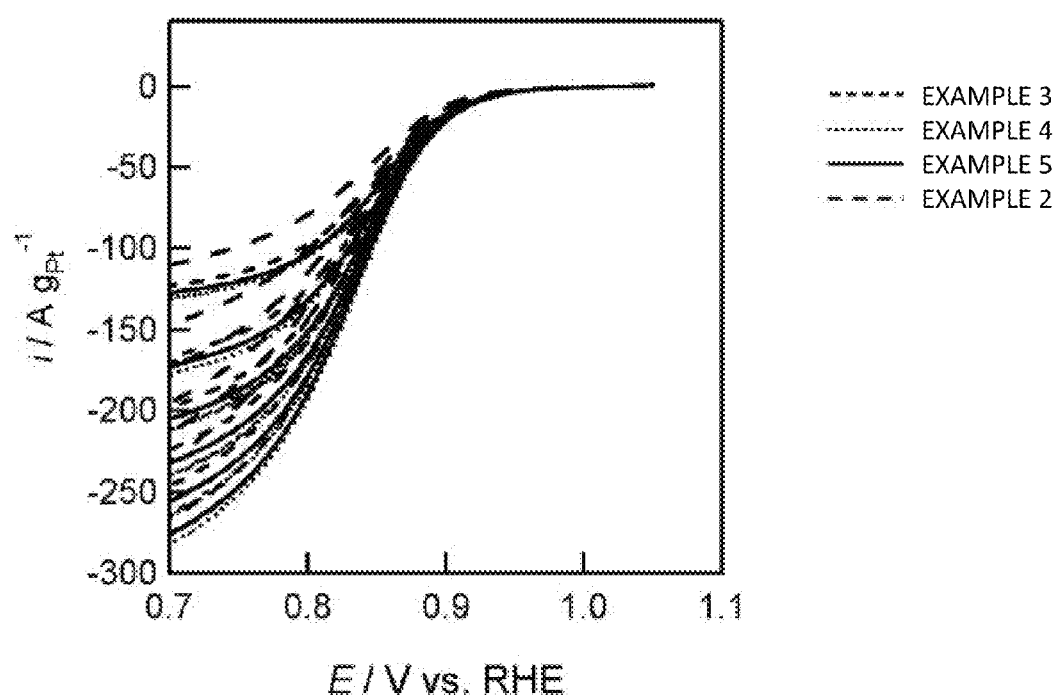
FIG. 23 is a graph showing the LSV evaluation results of respective silica-platinum composite catalysts prepared under the conditions of Examples 3 to 5.

In order to evaluate the degrees of hydrophobization in the obtained respective silica-platinum composite catalysts of Examples 3 to 5 and Example 2 (the above results are shown as a reference), the contact angle was measured. The powder sample was molded into a solid tablet of about 1 mm in thickness and about 1 cm in diameter by a tablet molding machine; 2 µl of ion exchange distilled water was dropped on the tablet; and the contact angle was measured by a contact angle measuring device (made by Kyowa Interface Science Co., Ltd., trade name: "DropMaster 300"). The contact angle was indicated as an average value of 5 measurement values. FIG. 22 is a graph showing CV evaluation results of the respective silica-platinum composite catalysts prepared under the conditions of Examples 3 to 5. FIG. 23 is a graph showing LSV evaluation results of the respective silica-platinum composite catalysts prepared under the conditions of Examples 3 to 5. Properties of the respective silica-platinum composite catalysts of Examples 3 to 5 acquired by FIGS. 22 and 23 and the contact angle measurements and of Example 2 are collectively shown in Table 4.

TABLE 4

| Sample | Average Contact Angle $H_2O/°$ | Platinum Active Specific Surface Area $m^2/g$ | Kinetically-Controlled Current Value per Platinum Mass at 0.85 V ik-mass @ 0.85 V A/g | Kinetically-Controlled Current Value per Platinum Mass at 0.80 V ik-mass @ 0.80 V A/g | Kinetically-Controlled Current Value per Platinum Mass at 0.75 V ik-mass @ 0.75 V A/g | Kinetically-Controlled Current Value per Platinum Active Specific Surface Area at 0.85 V ik-s @ 0.85 V mA/cm² |
| --- | --- | --- | --- | --- | --- | --- |
| Example 3 | 16.8 | 42.4 | 126.5 | 427.4 | 852.5 | 0.30 |
| Example 4 | 16.3 | 46.2 | 138.5 | 449.3 | 952.8 | 0.30 |
| Example 5 | 23.1 | 39.0 | 129.9 | 433.6 | 868.8 | 0.33 |
| Example 2 | 6.8 | 37.5 | 99.5 | 318.8 | 604.8 | 0.27 |

As shown in Table 4, the respective average contact angles of the respective silica-platinum composite catalysts of Examples 3 to 5 were larger than the average contact angle of Example 2. It was found therefrom that the hydrophobization step hydrophobized the powder surface of the silica-platinum composite catalysts of Examples 3 to 5. As shown in FIGS. 17, 19 and 21, the average wire diameter of platinum chains of the silica-platinum composite catalysts of Examples 3 to 5 was 4.3 nm. This diameter was nearly equal to an average wire diameter of 4.4 nm of platinum chains of Example 2. However, the standard deviations of the average wire diameters of platinum chains of the silica-platinum composite catalysts of Examples 3 to 5 were smaller than that of Example 2 (see FIG. 5). Therefore, it was found that the silica-platinum composite catalysts of Examples 3 to 5 had more uniform wire diameters of platinum chains than that of Example 2.

As shown in Table 4, the platinum active specific surface areas of the silica-platinum composite catalysts of Examples 3 to 5 were larger nearly by two times than the platinum active specific surface area of that of Comparative Example 1. Also the platinum active specific surface areas of the silica-platinum composite catalysts of Examples 1 and 2 were larger nearly by 1.5 times than the platinum active specific surface area of that of Comparative Example 1. The silica-platinum composite catalysts of Examples 3 to 5 had larger platinum active specific surface areas than that of Example 2, and had a larger $i_{k\text{-}mass}$ particularly at a low voltage (for example, 0.75 V). This is conceivably because the hydrophobization of the vicinity of platinum smoothened the feed of oxygen to the platinum to thereby improve the rate limitation of the oxygen feed.

Examples 6 to 9

Figure 24:
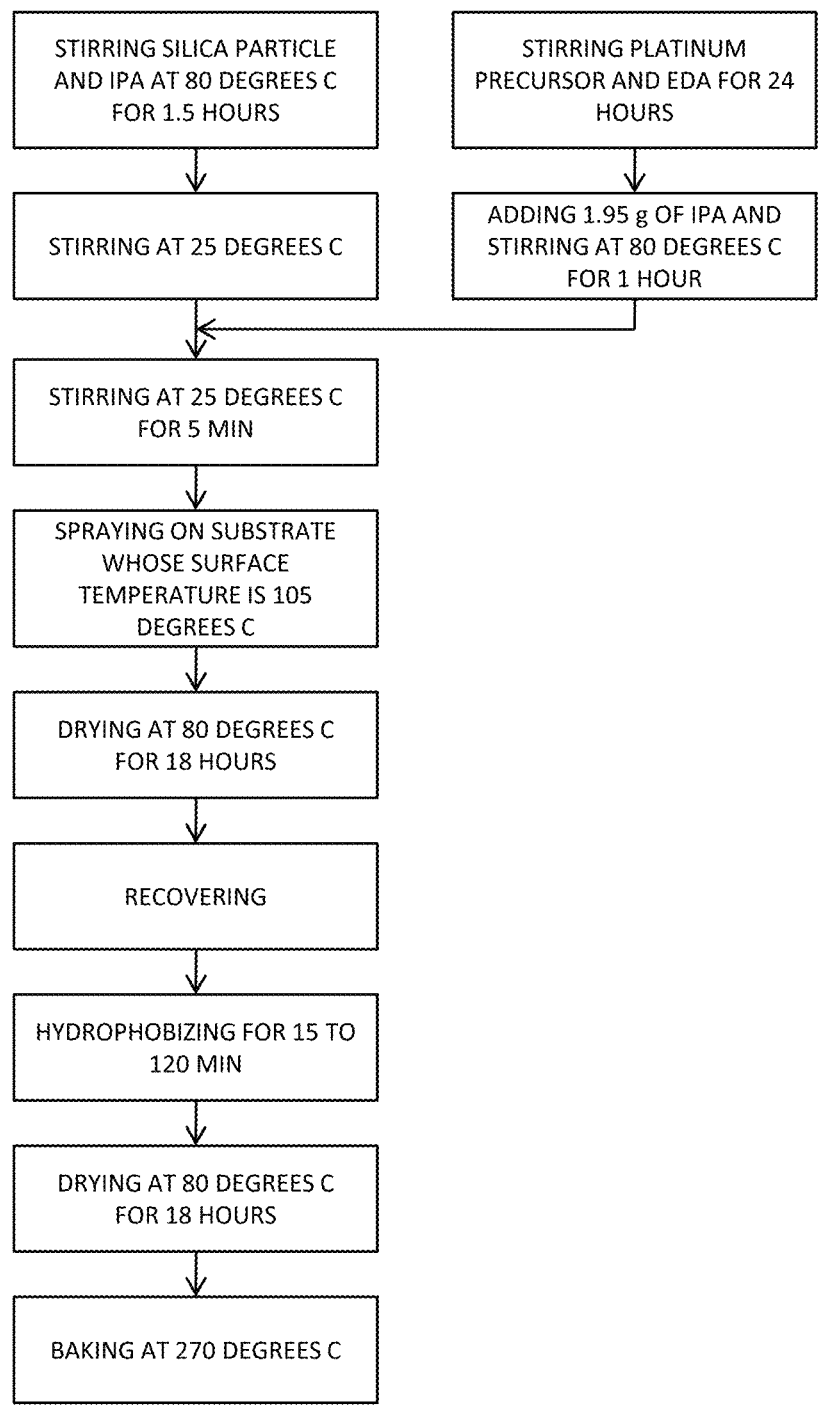
FIG. 24 is a flowchart showing a flow of a method for manufacturing silica-platinum composite catalysts of Examples 6 to 9.

FIG. 24 is a flowchart showing a flow of a method for manufacturing silica-platinum composite catalysts of Examples 6 to 9.

The raw material solution was sprayed on a glass substrate whose surface temperature was 105 degrees C. by the same manufacturing method as in Example 2. Thereafter, the sprayed raw material solution was dried at 80 degrees C. for 18 hours. Then, an obtained deposit was recovered, and exposed to a vapor atmosphere of hexamethyldisilazane (about 5 degrees C.) separately for four times of 15 min (Example 6: made to be a sample A1), 30 min (Example 7: made to be a sample A2), 60 min (Example 8: made to be a sample A3) and 120 min (Example 9: made to be a sample A4) under stirring at a rotation frequency of 100 rpm in a hermetically closed desiccator of 20 degrees C., to thereby hydrophobize the deposit surface. Thereafter, each sample was dried at 80 degrees C. for 18 hours, and then baked in a mixed gas atmosphere of 10% $H_2$ and 90% $N_2$ at 270 degrees C.

Figure 25:
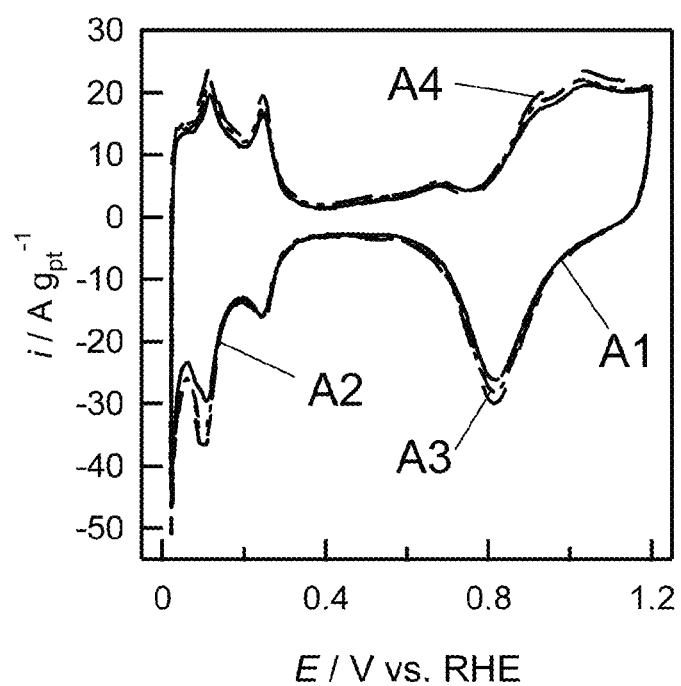
FIG. 25 is a graph showing the CV evaluation results of the respective silica-platinum composite catalysts prepared under the respective conditions of Examples 6 to 9.
Figure 26:
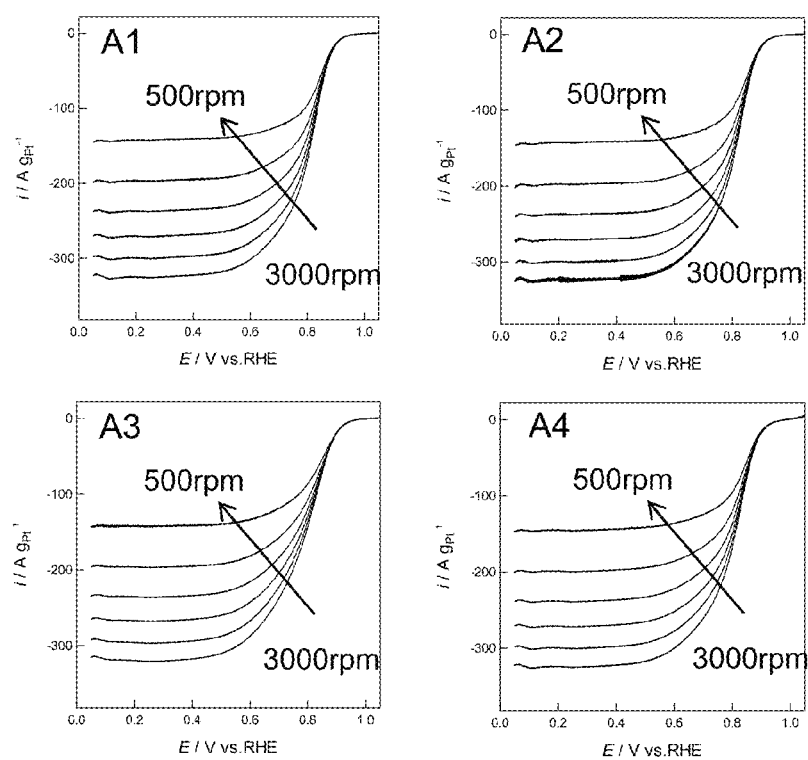
FIG. 26 shows graphs showing the LSV evaluation results of the respective silica-platinum composite catalysts prepared under the respective conditions of Examples 6 to 9.

FIG. 25 is a graph showing CV evaluation results of the respective silica-platinum composite catalysts prepared under the respective conditions of Examples 6 to 9. FIG. 26 shows graphs showing LSV evaluation results of the respective silica-platinum composite catalysts prepared under the respective conditions of Examples 6 to 9. Properties shown in FIGS. 25 and 26 are collectively shown in Table 5.

K.K., product name: TEC10E50E). The evaluation was carried out by varying the catalyst weight of the each sample in 1 to 10 µg.

Figure 27:
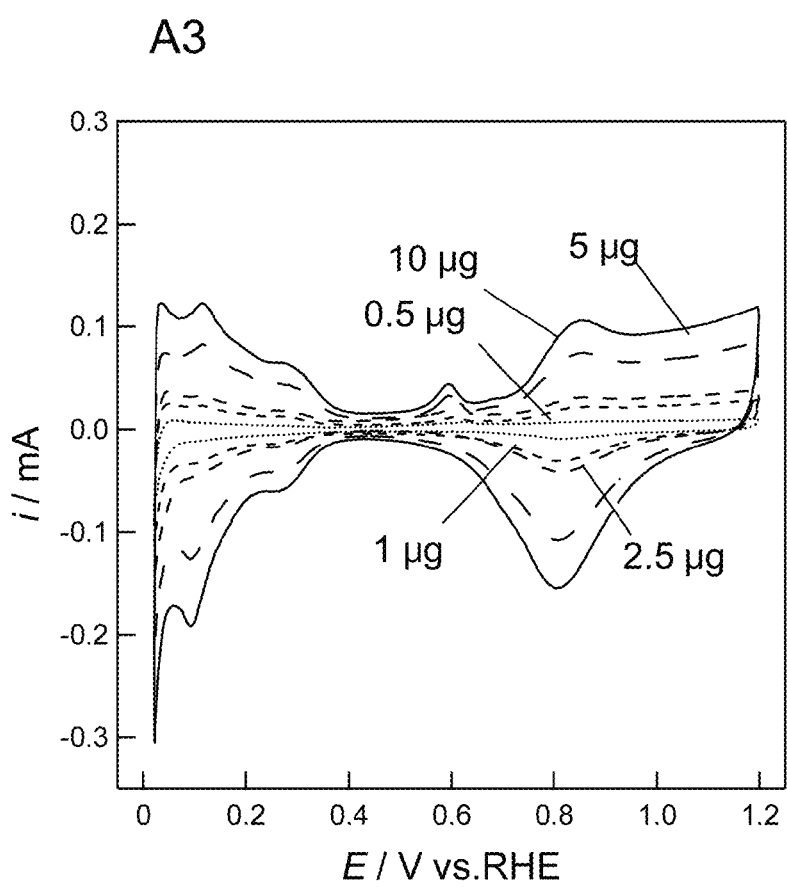
FIG. 27 shows CV waveforms of Example 8.
Figure 28:
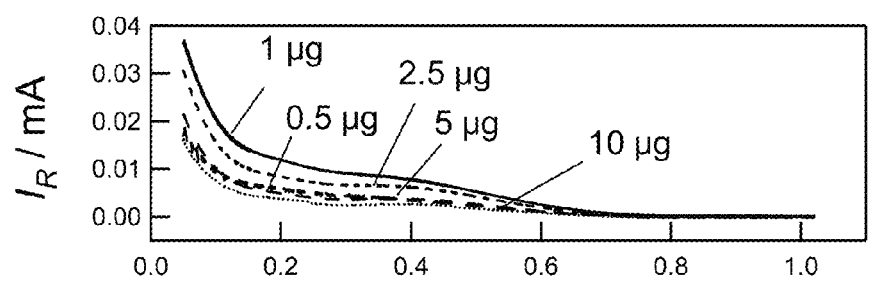
FIG. 28 shows the results of current values detected by a ring electrode measured correspondingly to the weights of the evaluated catalysts when LSV measurement is carried out by a rotating electrode by using the catalyst of Example 8.
Figure 29:
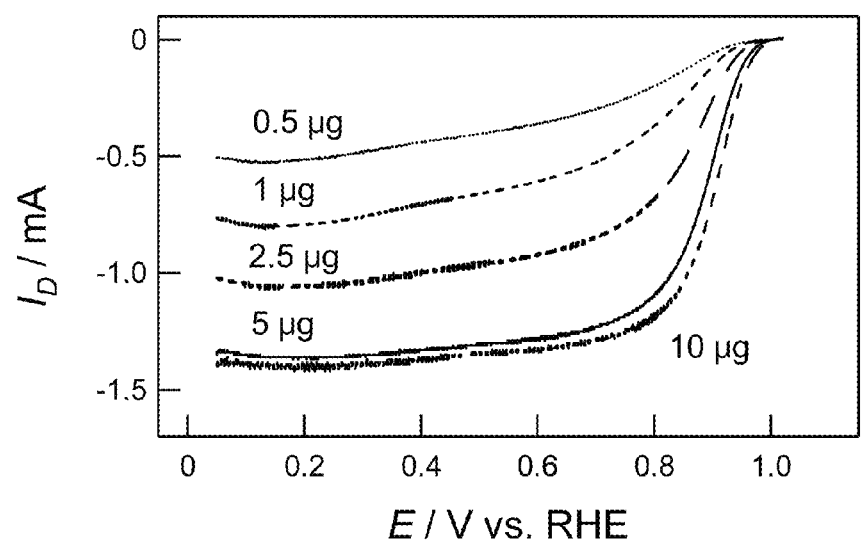
FIG. 29 shows the results of current values detected by a disk electrode measured correspondingly to the weights of the evaluated catalysts when LSV measurement is carried out by a rotating electrode by using the catalyst of Example 8.
Figure 30:
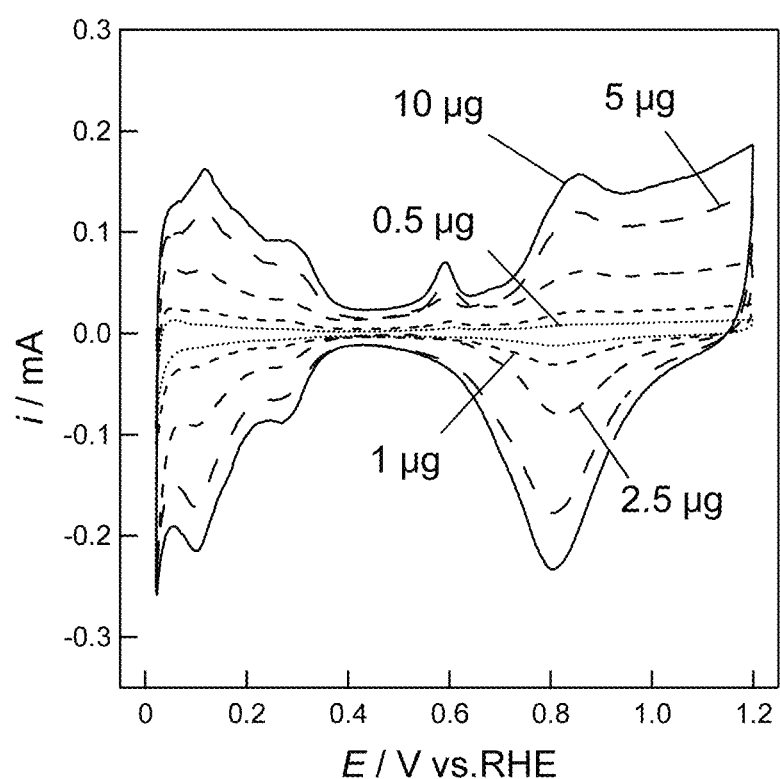
FIG. 30 shows the CV waveforms of Example 2.
Figure 31:
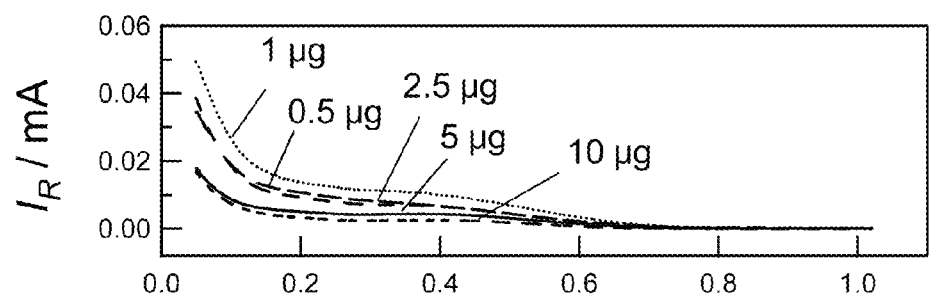
FIG. 31 shows the results of current values detected by a ring electrode measured correspondingly to the weights of the evaluated catalysts when LSV measurement is carried out by a rotating electrode by using the catalyst of Example 2.
Figure 32:
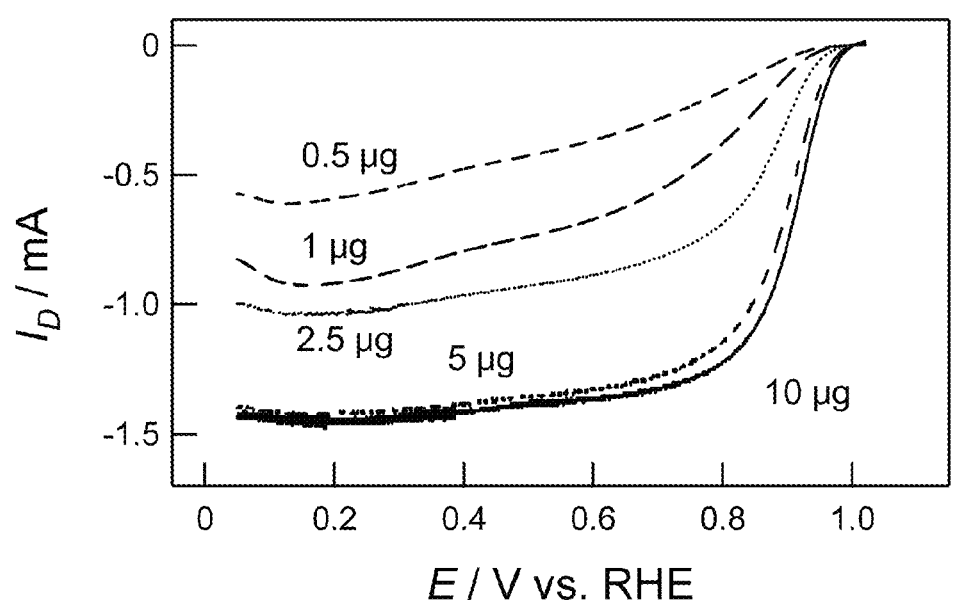
FIG. 32 shows the results of current values detected by a disk electrode measured correspondingly to the weights of the evaluated catalysts when LSV measurement is carried out by a rotating electrode by using the catalyst of Example 2.
Figure 33:
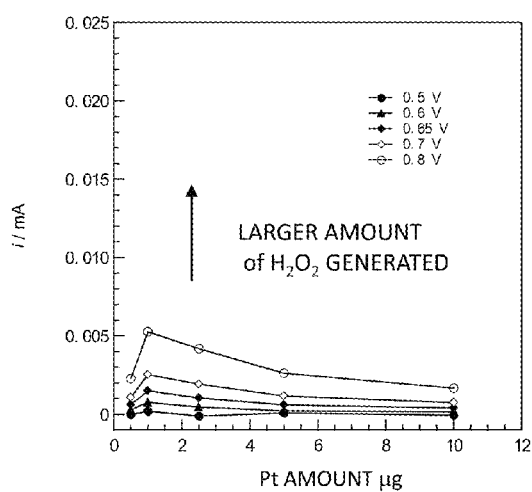
FIG. 33 shows relations between each of the platinum weights of Example 8, Example 2 and a commercially available Pt/C catalyst on electrodes and the current value (i/mA).
Figure 33:
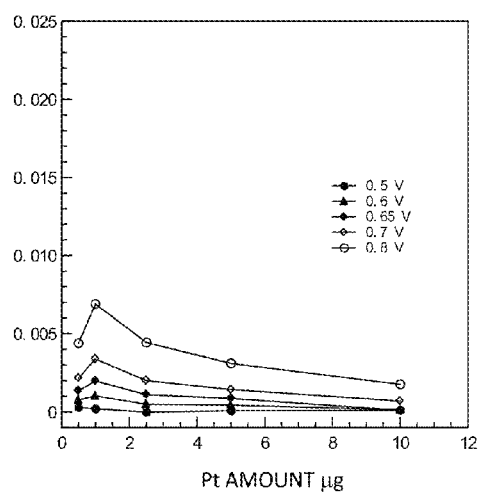
Figure 33:
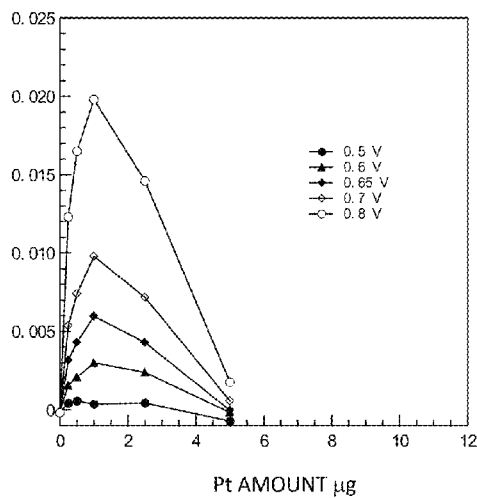

FIG. 27 shows CV waveforms of Example 8. FIG. 28 shows results of current values detected by a ring electrode measured correspondingly to evaluated catalyst weights when LSV measurement was carried out by a rotating electrode by using the catalyst of Example 8. FIG. 29 shows results of current values detected by a disk electrode measured correspondingly to evaluated catalyst weights when LSV measurement was carried out by a rotating electrode by using the catalyst of Example 8. FIG. 30 shows CV waveforms of Example 2. FIG. 31 and FIG. 32 show results of the same evaluations as FIG. 28 and FIG. 29 of Example 2, respectively. FIG. 33 shows relations between each of the platinum weights of the electrode of Example 8, Example 2 and the commercially available Pt/C catalyst on the electrodes and the current value (i/mA).

Comparing Example 8 and Example 2 to the commercially available Pt/C catalyst, the amount of hydrogen peroxide generated was about ¼ of that in the commercially available Pt/C catalyst, irrespective of the presence/absence of the hydrophobization. In a fuel cell, generation of hydrogen peroxide as a by-product in oxygen reduction is confirmed. Generation of hydrogen peroxide poses a problem of corrosion or breakage of an electrolyte membrane (perfluorosulfonic acid-based membrane or the like). In order to reduce the maintenance cost or improve the apparatus life, a platinum catalyst is demanded which can reduce the amount of hydrogen peroxide generated which causes corrosion or breakage of peripheral members. In consideration of the evaluation results shown in FIG. 33 from this viewpoint, it is believed that the silica-platinum composite catalysts (Example 8 and Example 2) are better catalysts than the commercially available Pt/C catalyst.

<Zirconia-Platinum Composite Catalyst>

Example 10 and Comparative Example 4

1.286 g of a zirconia nanoparticle and 3 g of IPA were stirred under heating at 80 degrees C. for 1.5 hours, and then

TABLE 5

| Sample | Platinum Active Specific Surface Area m²/g | Kinetically-Controlled Current Value per Platinum Mass at 0.85 V ik-mass @ 0.85 V A/g | Kinetically-Controlled Current Value per Platinum Mass at 0.80 V ik-mass @ 0.80 V A/g | Kinetically-Controlled Current Value per Platinum Mass at 0.75 V ik-mass @ 0.75 V A/g | Kinetically-Controlled Current Value per Platinum Active Specific Surface Area at 0.85 V ik-s @ 0.85 V mA/cm² |
|---|---|---|---|---|---|
| Example 6 | 32.6 | 105.4 | 368.4 | 738.3 | 0.323 |
| Example 7 | 33.4 | 96.8 | 362.2 | 750.8 | 0.29 |
| Example 8 | 33.7 | 104.8 | 363.2 | 726.7 | 0.31 |
| Example 9 | 36.3 | 104 | 345.8 | 694.4 | 0.287 |

As is clear from comparison of Examples 6 to 9 with Example 2 described before (see Table 5 and Table 4), the samples hydrophobized using hexamethyldisilazane exhibited nearly equal current values near at 0.85 V to that of the sample not hydrophobized, but larger current values at 0.8 V or lower. This is conceivably because the hydrophobization of the vicinity of platinum smoothened the feed of oxygen to the platinum to thereby improve the rate limitation of the oxygen feed.

Then, generation of hydrogen peroxide was compared and evaluated in Example 8 (hydrophobization treatment), Example 2 (no hydrophobization treatment), and a commercially available Pt/C catalyst (platinum was carried on carbon particles, Pt: 46.4 wt %, made by Tanaka Kikinzoku Kogyo stirred at 25 degrees C. Under the same condition as in Example 8 except for this, a zirconia-platinum composite catalyst was fabricated (Example 10: made to be a sample C2). Under the same condition as in Example 10 except for not carrying out the hydrophobization step, a zirconia-platinum composite catalyst as a comparison was fabricated (Comparative Example 4: made to be a sample C1).

Figure 34:
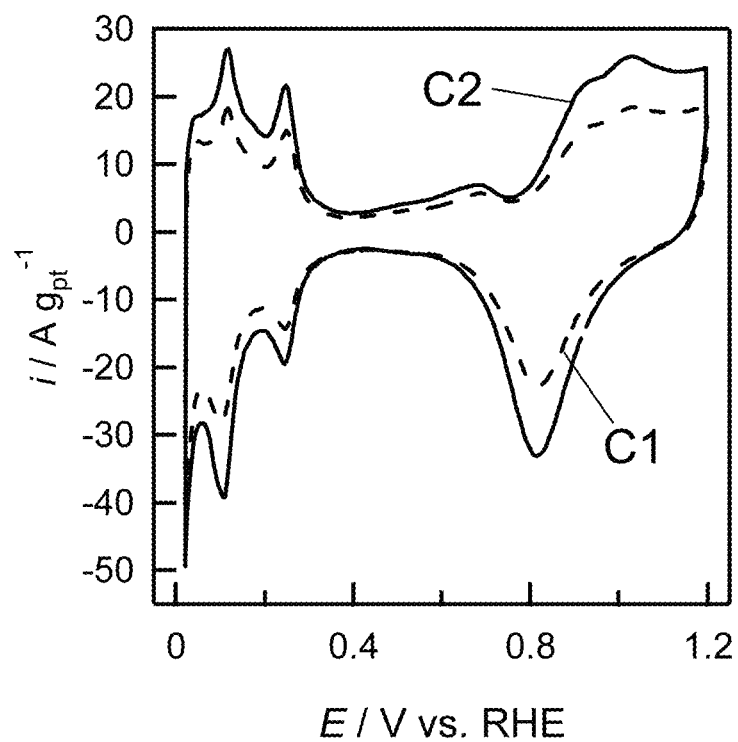
FIG. 34 is a graph showing the CV evaluation results of the respective zirconia-platinum composite catalysts prepared under the respective conditions of Example 10 and Comparative Example 4.
Figure 35:
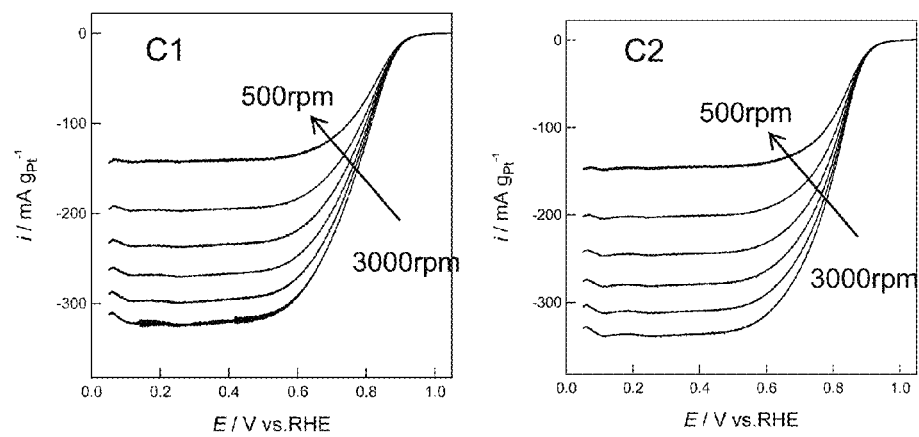
FIG. 35 shows graphs showing the LSV evaluation results of the respective zirconia-platinum composite catalysts prepared under the respective conditions of Example 10 and Comparative Example 4.

FIG. 34 is a graph showing CV evaluation results of the respective zirconia-platinum composite catalysts prepared under the respective conditions of Example 10 and Comparative Example 4. FIG. 35 shows graphs showing LSV evaluation results of the respective zirconia-platinum composite catalysts prepared under the respective conditions of Example 10 and Comparative Example 4. Properties shown in FIGS. 34 and 35 are collectively shown in Table 6.

TABLE 6

| Sample | Platinum Active Specific Surface Area m²/g | Kinetically-Controlled Current Value per Platinum Mass at 0.85 V ik-mass @ 0.85 V A/g | Kinetically-Controlled Current Value per Platinum Mass at 0.80 V ik-mass @ 0.80 V A/g | Kinetically-Controlled Current Value per Platinum Mass at 0.75 V ik-mass @ 0.75 V A/g | Kinetically-Controlled Current Value per Platinum Active Specific Surface Area at 0.85 V ik-s @ 0.85 V mA/cm² |
|---|---|---|---|---|---|
| Comparative Example 4 | 27.1 | 76.2 | 205.7 | 392.3 | 0.281 |
| Example 10 | 39.7 | 105.6 | 305.1 | 585.1 | 0.266 |

Even if a zirconia was used as a metal oxide other than silica, a composite catalyst could be fabricated which exhibited an activity in the same level as a catalyst in which platinum is carried on a carbon particle. The composite catalyst having been subjected to a hydrophobization treatment (Example 10) exhibited a larger $i_{k\text{-}mass}$ and specific surface area than the composite catalyst not having been subjected to any hydrophobization treatment (Comparative Example 4). It was found from such a result that the catalytic activity effect by the hydrophobization treatment was recognized also in a metal oxide other than silica.

INDUSTRIAL APPLICABILITY

The present invention can be utilized, for example, for a catalyst.

The invention claimed is:

1. A metal oxide-platinum composite catalyst, comprising:
   5 to 95 parts by weight of a metal oxide; and
   95 to 5 parts by weight of platinum as the balance to the metal oxide,
   wherein the platinum has a form of wires constituting a mesh to reticulately cover at least a part of a particle of the metal oxide; and
   the wires constituting the platinum mesh have an average wire diameter of 5 nm or smaller.

2. The metal oxide-platinum composite catalyst according to claim 1,
   wherein a fluoro group-containing compound or an alkyl group-containing compound is adsorbed on a surface of the metal oxide, or a reaction product of the compound with the metal oxide is formed thereon.

3. The metal oxide-platinum composite catalyst according to claim 1,
   wherein the metal oxide is one or two or more metal oxides selected from silica, zirconia and ceria.

4. The metal oxide-platinum composite catalyst according to claim 1,
   wherein the metal oxide-platinum composite catalyst has a surface having an average contact angle to water of 15 degrees or larger.

5. A method for manufacturing the metal oxide-platinum composite catalyst according to claim 1, comprising:
   a dispersion step of dispersing a metal oxide in a dispersion medium;
   a dissolution step of dissolving chloroplatinic acid in a solvent containing ethylenediamine;
   a raw material solution preparation step of mixing the metal oxide dispersion solution obtained by the dispersion step and the chloroplatinic acid solution obtained by the dissolution step to thereby prepare a raw material solution;
   a spray step of spraying the raw material solution on a base material heated to 60 to 200 degrees C.;
   a recovery step of recovering a metal oxide-platinum composite containing the metal oxide and the platinum from the base material; and
   a baking step of baking the recovered metal oxide-platinum composite under a reducing atmosphere at a temperature equal to or higher than the temperature of the base material in the spray step and 300 degrees C. or lower.

6. The method for manufacturing a metal oxide-platinum composite catalyst according to claim 5,
   further comprising, after the recovery step, a hydrophobization step in which an alkylsilane compound or an alkoxysilane compound is adsorbed on a surface of the metal oxide-platinum composite, or a reaction product of the compound with the metal oxide is formed thereon.

7. The method for manufacturing a metal oxide-platinum composite catalyst according to claim 6,
   wherein the hydrophobization step uses a fluoro group-containing or alkyl group-containing alkylsilane compound or alkoxysilane compound.

* * * * *